(12) United States Patent
Donnally et al.

(10) Patent No.: US 11,891,864 B2
(45) Date of Patent: Feb. 6, 2024

(54) PIPE HANDLING ARM

(71) Applicant: NATIONAL OILWELL VARCO, L.P., Houston, TX (US)

(72) Inventors: Robert Benjamin Donnally, Houston, TX (US); Xi Lin Liu, Shanghai (CN)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 339 days.

(21) Appl. No.: 17/310,188

(22) PCT Filed: Dec. 11, 2019

(86) PCT No.: PCT/CN2019/124443
§ 371 (c)(1),
(2) Date: Jul. 23, 2021

(87) PCT Pub. No.: WO2020/151386
PCT Pub. Date: Jul. 30, 2020

(65) Prior Publication Data
US 2022/0178215 A1 Jun. 9, 2022

Related U.S. Application Data

(63) Continuation-in-part of application No. PCT/US2019/044979, filed on Aug. 2, 2019, and a
(Continued)

(51) Int. Cl.
E21B 19/14 (2006.01)
B25J 9/16 (2006.01)
(Continued)

(52) U.S. Cl.
CPC ............ *E21B 19/14* (2013.01); *B25J 9/1628* (2013.01); *B25J 11/00* (2013.01); *E21B 19/06* (2013.01);
(Continued)

(58) Field of Classification Search
CPC ........ E21B 19/14; E21B 19/06; E21B 19/084; B25J 9/1628; B25J 11/00; B25J 13/081; B25J 13/086; B25J 13/087
See application file for complete search history.

(56) References Cited

U.S. PATENT DOCUMENTS 600,988 A 3/1898 Hayes
1,386,210 A 8/1921 Thomas
(Continued)

FOREIGN PATENT DOCUMENTS

CA 2911388 A1 11/2014
CA 2855105 A1 12/2015
(Continued)

OTHER PUBLICATIONS

"U.S. Appl. No. 16/431,533, Final Office Action dated Jul. 21, 2022", 13 pgs.
(Continued)

*Primary Examiner* — Steven A MacDonald
(74) *Attorney, Agent, or Firm* — Schwegman Lundberg & Woessner, P.A.

(57) ABSTRACT

A drilling rig having a lift arm, which may be an auxiliary lift arm provided in addition to a primary lifting cable system of the drilling rig. The lift arm may be configured to hoist and/or manipulate drill collar, drill pipe, or other drilling pipe or conduit. The lift arm may be coupled to a mast of the drilling rig and may have a cantilevered boom extending therefrom. The boom may be configured to pivot between alignment, or near alignment, with well center and a racking board. The lift arm may additionally have a pipe engaging element coupled to the boom. The pipe engaging element may be configured to couple to stands or lengths of drilling pipe. The pipe engaging element may be raised and lowered together with or relative to the boom via a lift line
(Continued)

controllable via a hydraulic cylinder, winch, or other suitable mechanism for withdrawing and releasing the line.

17 Claims, 26 Drawing Sheets

Related U.S. Application Data continuation-in-part of application No. 16/431,533, filed on Jun. 4, 2019, now Pat. No. 11,613,940.

(60) Provisional application No. 62/797,042, filed on Jan. 25, 2019.

(51) Int. Cl.
  *B25J 11/00* (2006.01)
  *E21B 19/06* (2006.01)
  *E21B 19/084* (2006.01)
  *B25J 13/08* (2006.01)

(52) U.S. Cl.
  CPC ........... *E21B 19/084* (2013.01); *B25J 13/081* (2013.01); *B25J 13/086* (2013.01); *B25J 13/087* (2013.01)

(56) References Cited

U.S. PATENT DOCUMENTS

| | | |
|---|---|---|
| 1,494,524 A | 5/1924 | Adamson |
| 1,589,781 A | 6/1926 | Anderson |
| 1,818,278 A | 8/1931 | Siler |
| 2,109,344 A | 2/1938 | Selger |
| 2,314,867 A | 3/1943 | Alexander |
| 2,531,930 A | 11/1950 | Woolslayer et al. |
| 2,613,051 A | 10/1952 | Joseph |
| 2,615,681 A | 10/1952 | True |
| 2,616,646 A | 11/1952 | Frederick |
| 2,735,556 A | 2/1956 | Stone |
| 2,885,096 A | 5/1959 | De Jarnett |
| 2,946,464 A | 7/1960 | Guier |
| 3,154,275 A | 10/1964 | Stewart |
| 3,225,949 A | 12/1965 | Erickson et al. |
| 3,272,365 A | 9/1966 | Stevens |
| 3,361,453 A | 1/1968 | Brown et al. |
| 3,533,516 A | 10/1970 | Guier |
| 3,615,027 A | 10/1971 | Ham |
| 3,623,753 A | 11/1971 | Henry |
| 3,747,789 A | 7/1973 | Shipley et al. |
| 3,768,663 A | 10/1973 | Turner et al. |
| 3,840,128 A | 10/1974 | Swoboda et al. |
| 3,877,583 A | 4/1975 | Bokenkamp |
| 3,921,823 A | 11/1975 | Bourree et al. |
| 3,976,207 A | 8/1976 | Schultz |
| 3,994,350 A | 11/1976 | Smith et al. |
| 4,042,123 A | 8/1977 | Sheldon et al. |
| 4,117,941 A | 10/1978 | Mccleskey, Jr. et al. |
| 4,126,348 A | 11/1978 | Palmer |
| 4,269,554 A | 5/1981 | Jackson |
| 4,274,778 A * | 6/1981 | Putnam .................. E21B 19/14 414/733 |
| 4,289,442 A | 9/1981 | Stevens |
| 4,345,864 A * | 8/1982 | Smith, Jr. ............... E21B 19/14 901/14 |
| 4,348,920 A | 9/1982 | Boyadjieff |
| 4,397,605 A | 8/1983 | Cowgill et al. |
| 4,531,875 A | 7/1985 | Krueger |
| 4,591,006 A | 5/1986 | Hutchison et al. |
| 4,621,974 A | 11/1986 | Krueger |
| 4,680,519 A | 7/1987 | Chand et al. |
| 4,715,761 A | 12/1987 | Berry et al. |
| 4,738,321 A | 4/1988 | Olivier |
| 4,846,357 A | 7/1989 | Sholl et al. |
| 4,861,081 A | 8/1989 | Satoh |
| 4,899,095 A | 2/1990 | Kishi et al. |
| 5,038,871 A | 8/1991 | Dinsdale |
| 5,211,251 A | 5/1993 | Woolslayer |
| 5,494,320 A | 2/1996 | Cerruti |
| 5,813,286 A | 9/1998 | Hansen |
| 5,921,329 A | 7/1999 | Armstrong |
| 6,047,771 A | 4/2000 | Roeynestad |
| 6,260,646 B1 | 7/2001 | Fernandez et al. |
| 6,412,576 B1 | 7/2002 | Meiners |
| 6,460,900 B1 | 10/2002 | Bakke |
| 7,137,616 B2 | 11/2006 | Kysely |
| 7,219,744 B2 | 5/2007 | Pietras |
| 7,249,639 B2 | 7/2007 | Belik |
| 7,341,281 B2 | 3/2008 | Guesnon et al. |
| 7,370,707 B2 | 5/2008 | Mcdaniel et al. |
| 7,390,032 B2 | 6/2008 | Hughes |
| 7,493,960 B2 | 2/2009 | Leising et al. |
| 7,726,929 B1 | 6/2010 | Orgeron |
| 7,905,311 B2 | 3/2011 | Brown |
| 7,946,795 B2 | 5/2011 | Orgeron |
| 7,984,757 B1 | 7/2011 | Keast et al. |
| 8,074,484 B2 | 12/2011 | Denkmeier et al. |
| 8,191,637 B2 | 6/2012 | Havinga |
| 8,210,269 B2 | 7/2012 | Hudson et al. |
| 8,317,448 B2 | 11/2012 | Hankins et al. |
| 8,504,206 B2 | 8/2013 | Fudaba et al. |
| 8,550,761 B2 | 10/2013 | Belik et al. |
| 8,690,508 B1 | 4/2014 | Orgeron |
| 8,936,424 B1 * | 1/2015 | Barnes .................... E21B 19/15 414/746.3 |
| 9,133,968 B2 | 9/2015 | Elrick et al. |
| 9,157,286 B2 * | 10/2015 | Richardson ............. E21B 19/14 |
| 9,291,010 B1 | 3/2016 | Barnes |
| 9,388,923 B2 | 7/2016 | Romano |
| 9,706,185 B2 | 7/2017 | Ellis |
| 9,845,645 B2 | 12/2017 | Hughes et al. |
| 10,047,908 B1 | 8/2018 | Bohle, II et al. |
| 10,053,934 B2 * | 8/2018 | Keogh .................... E21B 19/24 |
| 10,190,374 B2 | 1/2019 | Bowley et al. |
| 10,246,952 B2 * | 4/2019 | Trydal ................... E21B 19/14 |
| 10,384,907 B2 | 8/2019 | Upmeier et al. |
| 10,612,322 B2 * | 4/2020 | Doyon ................. E21B 19/155 |
| 10,794,126 B2 | 10/2020 | Magnuson |
| 10,988,994 B2 | 4/2021 | Clarke et al. |
| 10,995,564 B2 | 5/2021 | Miller et al. |
| 11,035,183 B2 * | 6/2021 | Donnally ............. B25J 15/0042 |
| 11,220,888 B2 | 1/2022 | Ocegueda-Hernandez et al. |
| 11,274,508 B2 | 3/2022 | Mckenzie et al. |
| 11,352,843 B2 * | 6/2022 | Callaghan ............. E21B 19/161 |
| 11,365,592 B1 | 6/2022 | Moon et al. |
| 11,613,932 B2 * | 3/2023 | Saebo .................... E21B 19/14 175/57 |
| 11,613,940 B2 * | 3/2023 | Mckenzie ............. B25J 9/1628 414/22.71 |
| 2002/0175519 A1 | 11/2002 | Mack et al. |
| 2003/0159854 A1 | 8/2003 | Simpson et al. |
| 2004/0057815 A1 | 3/2004 | Woolslayer et al. |
| 2005/0055132 A1 | 3/2005 | Matsumoto et al. |
| 2005/0113971 A1 | 5/2005 | Zhang et al. |
| 2005/0126792 A1 | 6/2005 | Berry |
| 2006/0081379 A1 | 4/2006 | Fehres et al. |
| 2006/0104747 A1 * | 5/2006 | Zahn ...................... E21B 19/14 414/22.63 |
| 2006/0124316 A1 | 6/2006 | Pietras |
| 2006/0231344 A1 | 10/2006 | Drzewiecki |
| 2006/0249292 A1 | 11/2006 | Guidry |
| 2007/0062705 A1 | 3/2007 | Schats et al. |
| 2007/0114069 A1 | 5/2007 | Hooper et al. |
| 2007/0228671 A1 | 10/2007 | Norton |
| 2008/0136203 A1 | 6/2008 | Krijnen et al. |
| 2008/0202812 A1 | 8/2008 | Childers et al. |
| 2008/0238095 A1 | 10/2008 | Yater et al. |
| 2008/0296065 A1 | 12/2008 | Standal |
| 2009/0283324 A1 | 11/2009 | Konduc et al. |
| 2010/0163247 A1 | 7/2010 | Wright et al. |
| 2010/0193198 A1 | 8/2010 | Murray et al. |
| 2010/0303586 A1 | 12/2010 | Hankins et al. |
| 2011/0079434 A1 | 4/2011 | Belik et al. |
| 2011/0120730 A1 | 5/2011 | Clasen et al. |
| 2011/0147009 A1 | 6/2011 | Dupal et al. |

(56) References Cited

U.S. PATENT DOCUMENTS

| | | |
|---|---|---|
| 2011/0226485 A1 | 9/2011 | Seneviratne et al. |
| 2012/0000671 A1* | 1/2012 | Krohn .................. E21B 19/20 166/380 |
| 2012/0018222 A1 | 1/2012 | Hankins et al. |
| 2012/0259337 A1 | 10/2012 | Del Rio et al. |
| 2013/0075114 A1 | 3/2013 | Dekker et al. |
| 2013/0142607 A1 | 6/2013 | Ditzler |
| 2013/0146305 A1 | 6/2013 | Dupal et al. |
| 2013/0192817 A1 | 8/2013 | Fournier, Jr. et al. |
| 2014/0050522 A1 | 2/2014 | Slaughter, Jr. et al. |
| 2014/0054089 A1 | 2/2014 | Sondervik |
| 2014/0090856 A1 | 4/2014 | Pratt et al. |
| 2014/0097027 A1 | 4/2014 | Marica et al. |
| 2014/0133939 A1* | 5/2014 | Richardson ........... E21B 19/155 414/22.55 |
| 2014/0145408 A1 | 5/2014 | Midas et al. |
| 2014/0202769 A1 | 7/2014 | Magnuson |
| 2014/0352978 A1* | 12/2014 | Eilertsen ................. E21B 19/06 166/380 |
| 2015/0016925 A1* | 1/2015 | Larkin .................... E21B 19/14 414/800 |
| 2015/0053424 A1 | 2/2015 | Wiens et al. |
| 2015/0127152 A1 | 5/2015 | Nammoto et al. |
| 2015/0148952 A1 | 5/2015 | Shiratsuchi |
| 2015/0232272 A1 | 8/2015 | Magnuson |
| 2015/0272579 A1 | 10/2015 | Leimbach et al. |
| 2015/0273688 A1 | 10/2015 | Harada et al. |
| 2015/0275596 A1 | 10/2015 | Hickie |
| 2015/0283704 A1 | 10/2015 | Watanabe |
| 2015/0330162 A1 | 11/2015 | Magnuson et al. |
| 2016/0024852 A1* | 1/2016 | Kannegaard ........... E21B 15/02 175/5 |
| 2016/0060979 A1 | 3/2016 | Magnuson |
| 2016/0102508 A1* | 4/2016 | Fox ........................ E21B 19/14 175/52 |
| 2016/0115745 A1 | 4/2016 | Bisel |
| 2016/0145954 A1 | 5/2016 | Helms et al. |
| 2016/0160586 A1* | 6/2016 | Keogh ................... E21B 19/24 414/800 |
| 2016/0168929 A1 | 6/2016 | Magnuson et al. |
| 2016/0201408 A1 | 7/2016 | Little et al. |
| 2017/0067303 A1 | 3/2017 | Thiemann et al. |
| 2017/0172295 A1 | 6/2017 | Tropper |
| 2017/0204687 A1 | 7/2017 | Yorga et al. |
| 2017/0232620 A1 | 8/2017 | Kalb et al. |
| 2017/0234088 A1 | 8/2017 | Orr et al. |
| 2017/0268302 A1 | 9/2017 | Orr et al. |
| 2018/0002987 A1* | 1/2018 | Kannegaard ......... E21B 21/001 |
| 2018/0171724 A1 | 6/2018 | Daigle et al. |
| 2018/0216405 A1* | 8/2018 | De Mul ................. E21B 15/00 |
| 2018/0238120 A1 | 8/2018 | Patterson et al. |
| 2018/0245408 A1 | 8/2018 | Keogh et al. |
| 2018/0328112 A1 | 11/2018 | Berry et al. |
| 2018/0334865 A1 | 11/2018 | Miller et al. |
| 2019/0017334 A1 | 1/2019 | Loeyning et al. |
| 2019/0063168 A1* | 2/2019 | Reddy .................... E21B 3/045 |
| 2019/0063649 A1 | 2/2019 | Snyder, II |
| 2019/0143532 A1 | 5/2019 | Cutkosky et al. |
| 2019/0145197 A1* | 5/2019 | Callaghan ............... E21B 19/14 166/77.52 |
| 2019/0309585 A1 | 10/2019 | Miller et al. |
| 2019/0352982 A1 | 11/2019 | Arefi et al. |
| 2020/0032597 A1 | 1/2020 | Jorgic et al. |
| 2020/0040673 A1 | 2/2020 | Donnally et al. |
| 2020/0040674 A1 | 2/2020 | Mckenzie et al. |
| 2020/0115969 A1* | 4/2020 | De Mul ................... E21B 19/00 |
| 2021/0246738 A1 | 8/2021 | Mckenzie et al. |
| 2021/0293099 A1* | 9/2021 | Carnegie ................ B25J 13/08 |
| 2021/0301602 A1* | 9/2021 | Mckenzie ............... E21B 41/04 |
| 2022/0145704 A1 | 5/2022 | Mckenzie |

FOREIGN PATENT DOCUMENTS

| | | |
|---|---|---|
| CN | 202064839 | 12/2011 |
| CN | 102979465 | 3/2013 |
| CN | 103410458 | 11/2013 |
| CN | 104976322 | 10/2015 |
| CN | 105113983 | 12/2015 |
| CN | 108266139 A | 7/2018 |
| CN | 110792399 A | 2/2020 |
| EP | 1510302 | 3/2005 |
| EP | 1953334 A2 | 8/2008 |
| EP | 3829823 | 9/2023 |
| GB | 2091788 A | 8/1982 |
| GB | 2532267 A | 5/2016 |
| JP | H09137689 A | 5/1997 |
| NO | 20151648 A1 | 12/2015 |
| WO | WO-8800274 A2 | 1/1988 |
| WO | WO-9958811 A1 | 11/1999 |
| WO | WO-0123701 A1 | 4/2001 |
| WO | WO-2004018829 A1 | 3/2004 |
| WO | 2007143842 | 12/2007 |
| WO | WO-2013082172 A1 | 6/2013 |
| WO | WO-2014179730 A1 | 11/2014 |
| WO | WO-2015043740 A1 | 4/2015 |
| WO | WO-2016024859 A1 | 2/2016 |
| WO | WO-2016197255 A1 | 12/2016 |
| WO | WO-2017039996 A1 | 3/2017 |
| WO | 2017087200 | 5/2017 |
| WO | WO-2017087595 A1 | 5/2017 |
| WO | WO-2017190120 A1 | 11/2017 |
| WO | WO-2017193204 A1 | 11/2017 |
| WO | WO-2019195651 A1 | 10/2019 |
| WO | WO-2020028852 A1 | 2/2020 |
| WO | WO-2020028853 A1 | 2/2020 |
| WO | WO-2020028853 A9 | 2/2020 |
| WO | WO-2020028856 A1 | 2/2020 |
| WO | WO-2020028858 A1 | 2/2020 |
| WO | 2020123399 | 6/2020 |
| WO | WO-2020151386 A1 | 7/2020 |
| WO | 2020160440 | 8/2020 |
| WO | WO-2020172407 A1 | 8/2020 |
| WO | 2021203122 | 10/2021 |
| WO | 2021226622 | 11/2021 |
| WO | 2022016168 A1 | 1/2022 |
| WO | 2022170302 | 8/2022 |

OTHER PUBLICATIONS

"U.S. Appl. No. 16/786,345, Final Office Action dated Jul. 28, 2022", 9 pgs.

"European Application Serial No. 19758551.6, Response filed Aug. 25, 2022 to Communication Pursuant to Article 94(3) EPC dated Apr. 28, 2022", 73 pgs.

"European Application Serial No. 19752902.7, Response filed Aug. 26, 2022 to Communication Pursuant to Article 94(3) EPC dated May 3, 2022", 70 pgs.

"U.S. Appl. No. 16/431,533, Examiner Interview Summary dated Sep. 14, 2022", 3 pgs.

"Saudi Arabia Application No. 521421154, Office Action dated Aug. 31, 2022", w o English translation, 10 pgs.

"U.S. Appl. No. 16/786,345, Response filed Sep. 27, 2022 to Final Office Action dated Jul. 28, 2022", 6 pgs.

"U.S. Appl. No. 16/786,345, Final Office Action dated Oct. 24, 2022", 8 pgs.

"U.S. Appl. No. 16/431,533, Response filed Oct. 21, 2022 to Final Office Action dated Jul. 21, 2022", 9 pgs.

"U.S. Appl. No. 16/431,533, Notice of Allowance dated Nov. 7, 2022", 8 pgs.

"U.S. Appl. No. 16/431,533, Corrected Notice of Allowability dated Nov. 16, 2022", 2 pgs.

"U.S. Appl. No. 16/786,345, Advisory Action dated Dec. 30, 2022", 3 pgs.

"U.S. Appl. No. 16/786,345, Non Final Office Action dated Jan. 19, 2023", 7 pgs.

"U.S. Appl. No. 17/248,669, Notice of Allowance dated Jan. 25, 2022", 8 pgs.

(56) References Cited

OTHER PUBLICATIONS

"U.S. Appl. No. 17/248,669, Response filed Jan. 5, 2022 to Non Final Office Action dated Oct. 5, 2021", 8 pgs.
"U.S. Appl. No. 16/836,365, Notice of Allowance dated Jul. 27, 2021", 7 pgs.
"U.S. Appl. No. 16/098,160, Response filed Jul. 27, 2021 to Final Office Action dated May 27, 2021", 9 pgs.
"International Application Serial No. PCT CN2019/124443, International Preliminary Report on Patentability dated May 26, 2021", 4 pgs.
"U.S. Appl. No. 16/098,160, Advisory Action dated Aug. 10, 2021", 4 pgs.
"U.S. Appl. No. 16/098,160, Advisory Action dated Jul. 22, 2020", 5 pgs.
"U.S. Appl. No. 16/098,160, Examiner Interview Summary dated Jun. 23, 2020", 3 pgs.
"U.S. Appl. No. 16/098,160, Final Office Action dated Apr. 30, 2020", 7 pgs.
"U.S. Appl. No. 16/098,160, Final Office Action dated May 27, 2021", 8 pgs.
"U.S. Appl. No. 16/098,160, Non Final Office Action dated Sep. 30, 2019", 8 pgs.
"U.S. Appl. No. 16/098,160, Non Final Office Action dated Oct. 6, 2020", 8 pgs.
"U.S. Appl. No. 16/098,160, Preliminary Amendment filed Nov. 1, 2018", 5 pgs.
"U.S. Appl. No. 16/098,160, Response filed Jan. 6, 2021 to Non Final Office Action dated Oct. 6, 2020", 7 pgs.
"U.S. Appl. No. 16/098,160, Response filed Jan. 30, 2020 to Non Final Office Action dated Sep. 30, 2019", 8 pgs.
"U.S. Appl. No. 16/098,160, Response filed Jun. 30, 2020 to Final Office Action dated Apr. 30, 2020", 8 pgs.
"U.S. Appl. No. 16/098,160, Response filed Aug. 24, 2020 to Advisory Action ated Jul. 22, 2020", 9 pgs.
"U.S. Appl. No. 16/375,927, Advisory Action dated Aug. 11, 2020", 6 pgs.
"U.S. Appl. No. 16/375,927, Corrected Notice of Allowability dated Jan. 26, 2021", 2 pgs.
"U.S. Appl. No. 16/375,927, Examiner Interview Summary dated Apr. 24, 2020", 3 pgs.
"U.S. Appl. No. 16/375,927, Examiner Interview Summary dated Dec. 7, 2020", 7 pgs.
"U.S. Appl. No. 16/375,927, Final Office Action dated Jun. 5, 2020", 10 pgs.
"U.S. Appl. No. 16/375,927, Non Final Office Action dated Feb. 28, 2020", 9 pgs.
"U.S. Appl. No. 16/375,927, Non Final Office Action dated Sep. 24, 2020", 10 pgs.
"U.S. Appl. No. 16/375,927, Notice of Allowance dated Jan. 1, 2021", 8 pgs.
"U.S. Appl. No. 16/375,927, Response filed May 27, 2020 to Non Final Office Action dated Feb. 28, 2020", 10 pgs.
"U.S. Appl. No. 16/375,927, Response filed Aug. 3, 2020 to Final Office Action dated Jun. 5, 2020", 11 pgs.
"U.S. Appl. No. 16/375,927, Response filed Sep. 8, 2020 to Advisory Action dated Aug. 11, 2020", 10 pgs.
"U.S. Appl. No. 16/375,927, Response filed Dec. 16, 2020 to Non Final Office Action dated Sep. 24, 2020", 8 pgs.
"U.S. Appl. No. 16/431,540, Examiner Interview Summary dated Jan. 19, 2021", 3 pgs.
"U.S. Appl. No. 16/431,540, Final Office Action dated Nov. 19, 2020", 10 pgs.
"U.S. Appl. No. 16/431,540, Non Final Office Action dated Jun. 10, 2020", 13 pgs.
"U.S. Appl. No. 16/431,540, Notice of Allowance dated Feb. 11, 2021", 5 pgs.
"U.S. Appl. No. 16/431,540, Response filed Jan. 19, 2021 to Final Office Action dated Nov. 19, 2020", 11 pgs.
"U.S. Appl. No. 16/431,540, Response Filed Sep. 10, 2020 to Non Final Office Action dated Jun. 10, 2020", 24 pgs.
"U.S. Appl. No. 16/431,540, Supplemental Notice of Allowability dated Mar. 11, 2021", 2 pgs.
"U.S. Appl. No. 16/836,365, Final Office Action dated May 4, 2021", 7 pgs.
"U.S. Appl. No. 16/836,365, Non Final Office Action dated Jan. 25, 2021", 8 pgs.
"U.S. Appl. No. 16/836,365, Response filed Apr. 22, 2021 to Non Final Office Action dated Jan. 25, 2021", 8 pgs.
"U.S. Appl. No. 16/836,365, Response filed Jul. 2, 2021 to Final Office Action dated May 4, 2021", 7 pgs.
"Canadian Application Serial No. 3,022,888, Voluntary Amendment filed Jul. 12, 2019", 10 pgs.
"International Application Serial No. PCT/CA2017/000125, International Preliminary Report on Patentability dated Nov. 22, 2018", 6 pgs.
"International Application Serial No. PCT/CA2017/000125, International Search Report dated Aug. 14, 2017", 3 pgs.
"International Application Serial No. PCT/CA2017/000125, Written Opinion dated Aug. 14, 1017", 4 pgs.
"International Application Serial No. PCT/CN2019/124443, International Search Report dated Mar. 5, 2020", 4 pgs.
"International Application Serial No. PCT/CN2019/124443, Written Opinion dated Mar. 5, 2020", 4 pgs.
"International Application Serial No. PCT/US2019/025942, International Preliminary Report on Patentability dated Oct. 30, 2020", 7 pgs.
"International Application Serial No. PCT/US2019/025942, International Search Report dated Jun. 27, 2019", 4 pgs.
"International Application Serial No. PCT/US2019/025942, Response filed Feb. 5, 2020 to Written Opinion dated Feb. 27, 2019", 14 pgs.
"International Application Serial No. PCT/US2019/025942, Response filed Apr. 23, 2020 to Written Opinion dated Apr. 23, 2020", 14 pgs.
"International Application Serial No. PCT/US2019/025942, Response filed Sep. 22, 2020 to Written Opinion dated Jul. 23, 2020", 4 pgs.
"International Application Serial No. PCT/US2019/025942, Written Opinion dated Feb. 24, 2020", 8 pgs.
"International Application Serial No. PCT/US2019/025942, Written Opinion dated Jun. 27, 2019", 9 pgs.
"International Application Serial No. PCT/US2019/025942, Written Opinion dated Jul. 23, 2020", 5 pgs.
"International Application Serial No. PCT/US2019/044974, International Preliminary Report on Patentability dated Nov. 11, 2020", 7 pgs.
"International Application Serial No. PCT/US2019/044974, International Search Report dated Oct. 24, 2019", 6 pgs.
"International Application Serial No. PCT/US2019/044974, Response filed Jun. 2, 2020 to Written Opinion dated Oct. 24, 2019", 13 pgs.
"International Application Serial No. PCT/US2019/044974, Response filed Aug. 18, 2020 to Written Opinion dated Jun. 19, 2020", 4 pgs.
"International Application Serial No. PCT/US2019/044974, Written Opinion dated Jun. 19, 2020", 7 pgs.
"International Application Serial No. PCT/US2019/044974, Written Opinion dated Oct. 24, 2019", 6 pgs.
"International Application Serial No. PCT/US2019/044976, International Preliminary Report on Patentability dated Mar. 9, 2021", 7 pgs.
"International Application Serial No. PCT/US2019/044976, International Search Report dated Oct. 18, 2019", 5 pgs.
"International Application Serial No. PCT/US2019/044976, Response filed Jun. 3, 2020 to Written Opinion dated Oct. 18, 2019", 11 pgs.
"International Application Serial No. PCT/US2019/044976, Response filed Aug. 25, 2020 to Written Opinion dated Jun. 26, 2020", 3 pgs.
"International Application Serial No. PCT/US2019/044976, Written Opinion dated Jun. 26, 2020", 4 pgs.
"International Application Serial No. PCT/US2019/044976, Written Opinion dated Oct. 18, 2019". 8 pgs.
"International Application Serial No. PCT/US2019/044976, Written Opinion dated Nov. 6, 2020", 6 pgs.
"International Application Serial No. PCT/US2019/044979, International Preliminary Report on Patentability dated Nov. 18, 2020", 7 pgs.
"International Application Serial No. PCT/US2019/044979, International Search Report dated Oct. 22, 2019", 6 pgs.

(56) References Cited

OTHER PUBLICATIONS

"International Application Serial No. PCT/US2019/044979, Response filed Jun. 3, 2020 to Written Opinion dated Oct. 22, 2019", 12 pgs.
"International Application Serial No. PCT/US2019/044979, Response filed Aug. 25, 2020 to Written Opinion dated Jun. 26, 2020", 3 pgs.
"International Application Serial No. PCT/US2019/044979, Written Opinion dated Jun. 26, 2020", 4 pgs.
"International Application Serial No. PCT/US2019/044979, Written Opinion dated Oct. 22, 2019", 7 pgs.
"International Application Serial No. PCT/US2019/044983, International Preliminary Report on Patentability dated Feb. 18, 2021", 8 pgs.
"International Application Serial No. PCT/US2019/044983, International Search Report dated Oct. 22, 2019", 5 pgs.
"International Application Serial No. PCT/US2019/044983, Written Opinion dated Oct. 22, 2019", 6 pgs.
"International Application Serial No. PCT/US2019/124443, Response filed Nov. 24, 2020 to Written Opinion dated Mar. 5, 2020", 10 pgs.
"International Application Serial No. PCT/US2020/019039, International Search Report dated May 15, 2020", 2 pgs.
"International Application Serial No. PCT/US2020/019039, Written Opinion dated May 15, 2020", 4 pgs.
"International Application Serial No. PCT/US2021/070319, International Search Report dated May 31, 2021", 5 pgs.
"International Application Serial No. PCT/US2021/070319, Written Opinion dated May 31, 2021", 6 pgs.
"International Application Serial No. PCT/US2021/070488, Invitation to Pay Additional Fees dated Jun. 28, 2021", 2 pgs.
"Moveit—Kinematic constraints: Visibility Constraint Class Reference", [online]. [retrieved Apr. 21, 2021]. Retrieved from the Internet: <URL: http://docs.ros.org/en/hydro/api/moveit_core/html/classkinematic_constraints_1_1VisibilityConstraint.html>, (2021), 8 pgs.
"Moveit—Moving robots into the future", [online]. [archived Dec. 4, 2020]. Retrieved from the Internet: <URL: https://web.archive.org/web/20201204224545/https://moveit.ros.org/>, (2020), 7 pgs.
"Chinese Application Serial No. 201811449262.0, Office Action dated Jan. 19, 2023", w English Translation, 22 pgs.
"International Application Serial No. PCT US2022 070377, Written Opinion of the International Preliminary Search Authority dated Jan. 12, 2023", 8 pgs.
"U.S. Appl. No. 16/786,345, Response filed Apr. 19, 2023 to Non Final Office Action dated Jan. 19, 2023", 8 pgs.
"International Application Serial No. PCT US2022 070377, International Preliminary Report on Patentability dated Apr. 4, 2023", 8 pgs.
"U.S. Appl. No. 17/310,672, Non Final Office Action dated Apr. 25, 2023", 12 pgs.
"U.S. Appl. No. 16/786,345, Final Office Action dated May 30, 2023", 7 pgs.
"U.S. Appl. No. 16/098,160, Corrected Notice of Allowability dated Mar. 25, 2022", 4 pgs.
"U.S. Appl. No. 16/786,345, Non Final Office Action dated Mar. 28, 2022", 13 pgs.
"International Application Serial No. PCT US2022 070377, International Search Report dated Mar. 25, 2022", 5 pgs.
"International Application Serial No. PCT US2022 070377, Written Opinion dated Mar. 25, 2022", 7 pgs.
"Saudia Arabian Application No. 521421161, Office Action dated Mar. 31, 2022", (w English Summary), 6 pgs.
"U.S. Appl. No. 16/431,533, Response Filed May 16, 2022 to Non Final Office Action dated Feb. 14, 2022", 11 pgs.
"U.S. Appl. No. 17/248,669, Corrected Notice of Allowability dated May 18, 2022", 3 pgs.
"European Application Serial No. 19758551.6, Communication Pursuant to Article 94(3) EPC dated Apr. 28, 2022", 4 pgs.
"European Application Serial No. 19752902.7, Communication Pursuant to Article 94(3) EPC dated May 3, 2022", 5 pgs.
"International Application Serial No. PCT US2021 070319, International Preliminary Report on Patentability dated May 10, 2022", 7 pgs.
"U.S. Appl. No. 16/786,345, Response filed Jun. 15, 2022 to Non Final Office Action dated Mar. 28, 2022", 12 pgs.
"U.S. Appl. No. 16/098,160, Response filed Aug. 27, 2021 to Advisory Action dated Aug. 10, 2021", 8 pgs.
"International Application Serial No. PCT/US2020/019039, International Preliminary Report on Patentability dated Sep. 2, 2021", 6 pgs.
"International Application Serial No. PCT/US2021/070786, Invitation to Pay Additional Fees dated Sep. 1, 2021", 2 pgs.
"International Application Serial No. PCT/US2021/070488, International Search Report dated Sep. 8, 2021", 4 pgs.
"International Application Serial No. PCT/US2021/070488, Written Opinion dated Sep. 8, 2021", 6 pgs.
"U.S. Appl. No. 16/098,160, Non Final Office Action dated Sep. 15, 2021", 8 pgs.
"U.S. Appl. No. 17/248,669, Non-Final Office Action dated Oct. 5, 2021", 8 pgs.
"U.S. Appl. No. 16/836,365, Notice of Allowance dated Nov. 3, 2021", 7 pgs.
"International Application Serial No. PCT/US2021/070786, International Search Report dated Nov. 9, 2021", 4 pgs.
"International Application Serial No. PCT/US2021/070786, Written Opinion dated Nov. 9, 2021", 7 pgs.
"Application Serial No. 16/098,160, Response filed Dec. 14, 2021 to Non Final Office Action dated Sep. 15, 2021", 8 pgs.
"U.S. Appl. No. 17/248,669, Examiner Interview Summary dated Dec. 17, 2021", 2 pgs.
"U.S. Appl. No. 16/098,160, Notice of Allowance dated Feb. 3, 2022", 7 pgs.
"U.S. Appl. No. 17/248,669, Notice of Allowability dated Feb. 3, 2022", 5 pgs.
"U.S. Appl. No. 16/431,533, Non Final Office Action dated Feb. 14, 2022", 15 pgs.
"U.S. Appl. No. 17/248,669, 312 Amendment filed Mar. 2, 2022", 3 pgs.
"U.S. Appl. No. 17/248,669, PTO Response to Rule 312 Communication dated Mar. 9, 2022", 2 pgs.
"U.S. Appl. No. 17/310,672, Response filed Jul. 18, 2023 to Non Final Office Action dated Apr. 25, 2023", 8 pgs.
"European Application Serial No. 21719521.3, Communication Pursuant to Article 94(3) EPC dated Jul. 17, 2023", 3 pgs.
"U.S. Appl. No. 17/310,672, Final Office Action dated Aug. 2, 2023", 13 pgs.
"U.S. Appl. No. 17/250,548, Restriction Requirement dated Aug. 21, 2023", 6 pgs.
"U.S. Appl. No. 16/786,345, Response filed Aug. 23, 2023 to Final Office Action dated May 30, 2023", 7 pgs.
"U.S. Appl. No. 16/786,345, Notice of Allowance dated Aug. 31, 2023", 6 pgs.
U.S. Appl. No. 16/098,160, filed Nov. 1, 2018, System and Method for Offline Standbuilding.
U.S. Appl. No. 16/375,927, U.S. Pat. No. 10,995,564, filed Apr. 5, 2019, System for Handling Tubulars on a Rig.
U.S. Appl. No. 16/431,533, filed Jun. 4, 2019, Devices, Systems, and Methods for Robotic Pipe Handling.
U.S. Appl. No. 17/250,548, filed Feb. 2, 2021, End Effectors for Automated Pipe Handling.
U.S. Appl. No. 16/836,365, filed Mar. 31, 2020, Robotic Pipe Handling From Outside a Setback Area.
U.S. Appl. No. 16/431,540, U.S. Pat. No. 11,035,183, filed Jun. 4, 2019, Devices, Systems, and Methods for Top Drive Clearing.
U.S. Appl. No. 16/786,345, filed Feb. 10, 2020, Quick Coupling Drill Pipe Connector.
U.S. Appl. No. 17/248,669, filed Feb. 2, 2021, Robot End-Effector Orientation Contstraint for Pipe Tailing Path.
U.S. Appl. No. 17/305,299, filed Jul. 2, 2021, Passive Tubular Connection Guide.
"U.S. Appl. No. 16/786,345, Corrected Notice of Allowability dated Sep. 20, 2023", 3 pgs.

(56) References Cited

OTHER PUBLICATIONS

"U.S. Appl. No. 17/310,672, Response filed Oct. 2, 2023 to Final Office Action dated Aug. 2, 2023", 9 pgs.
"U.S. Appl. No. No. 17/250,548, Response filed Oct. 4, 2023 to Restriction Requirement dated Aug. 21, 2023", 6 pgs.
"U.S. Appl. No. 17/310,672, Advisory Action dated Oct. 18, 2023", 4 pgs.
"U.S. Appl. No. 17/250,548, Non Final Office Action dated Oct. 20, 2023", 9 pgs.

* cited by examiner

PIPE HANDLING ARM

CLAIM OF PRIORITY

This patent application is a U.S. National Stage application of International Patent Application Serial No. PCT/CN2019/124443, filed Dec. 11, 2019, which claims the benefit of priority to International Patent Application Serial No. PCT/US2019/044979, filed Aug. 2, 2019, and also claims the benefit of priority to U.S. application Ser. No. 16/431,533, filed Jun. 4, 2019; and also claims the benefit of priority to U.S. application Ser. No. 62/797,042, filed Jan. 25, 2019, each of which are incorporated by reference herein in their entirety.

FIELD OF THE INVENTION

The present disclosure relates to pipe handling operations. In particular, the present disclosure relates to devices, systems, and methods for tripping drill pipe into and/or out of a well. More particularly, the present disclosure relates to a movable arm to facilitate tripping operations of drill collar and/or other types of piping.

BACKGROUND OF THE INVENTION

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Many pipe handling operations, such as drill pipe handling operations, are conventionally performed with workers performing manual operations. For example, drilling of wells involves tripping of the drill string, during which drill pipes are lowered into (tripping in) or pulled out of (tripping out) a well. Tripping may typically occur in order to change all or a portion of the bottom hole assembly, such as to change a drill bit. Where drill pipe is tripped into a well, stands or lengths of drill pipe may be supplied from a storage position in a setback area of the drill rig and connected end-to-end to lengthen the drill string in the well. Where drill pipe is tripped out of a well, stands or lengths of drill pipe may be disconnected from the drill string and may be positioned in the setback area.

As with other pipe handling operations, tripping has conventionally been performed with human operators. In particular, while an elevator or top drive may be used to carry the load of a stand of drill pipe during trip in and trip out operations, human operators may typically maneuver the drill pipe stands around the drill floor, such as between the well center and the setback area. For example, a first human operator may be positioned on the drill floor, at or near the well, to maneuver a lower end of drill pipe stands as they are tripped into or out of the well, while a second human operator may be positioned on or above the racking board to maneuver an upper end of drill pipe stands as the stands are moved between the well and the setback area. Operators often use ropes and/or other tools to maneuver the drill pipe stands on or above the drill floor. Such work is labor-intensive and can be dangerous. Moreover, trip in and trip out operations may be limited by the speed at which the human operators can maneuver the stands between well center and the setback area.

Still further, a drill string may be made up of a drill head arranged at the deepest tip of the string. A substantially heavy pipe, referred to as drill collar, may be arranged behind the drill head to create a weight on the deepest portions of the drill string. More conventional drill pipe may be arranged behind the drill collar and extending upward to the drill floor. When tripping in and/or out of a well, the handling of the drill collar can be much more labor intensive and potentially dangerous due to the very heavy nature of this portion of the drill string.

BRIEF SUMMARY OF THE INVENTION

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

The present disclosure, in one or more embodiments, relates to a lift arm for handling drilling pipe. The arm may include a boom having a first end and a second end, and the first end may be configured for pivotably coupling to a mast of a drilling rig. The lift arm may additionally have a pipe engaging element coupled to the boom and configured to engage with a length of drilling pipe. The lift arm may have a lift line configured to raise and lower the pipe engaging element. The boom may be extendable along a longitudinal axis of the boom in some embodiments. Moreover, the lift line may extend from a hydraulic cylinder or a winch. The boom may be arranged on a rail, and the lift line may be configured to raise and lower the boom along the rail. In some embodiments, the lift arm may have a hydraulic cylinder for pivoting the boom. The boom may be configured to pivot between a first position, where the second end is aligned with a well center, and a second position, wherein the second end is positioned near a racking board. In some embodiments, the pipe engaging element may include a collar clamp or a pipe elevator.

The present disclosure, in one or more embodiments, additionally relates to a drilling rig having a drill floor arranged above a well and having an opening for accessing the well, a mast extending from the drill floor, and a lift arm for handling drilling pipe. The lift arm may have a cantilevered boom coupled to the mast at a first end of the boom. The lift arm may additionally have a pipe engaging element coupled to the boom and configured to engage with a length of drilling pipe. A lift line may be configured to raise and lower the pipe engaging element. The boom may be pivotably coupled to the mast. In some embodiments, the drilling rig may additionally have a robotic pipe handler, which may be a first pipe handler arranged on the drill floor. The rig may further have a second robotic pipe handler, which may be arranged on a racking board. The rig may have a primary lifting system, which may include a cable reeved between a crown block and a traveling block. The boom of the lift arm may be extendable along a longitudinal axis thereof. In some embodiments, the lift line may extend from a hydraulic cylinder or winch. The boom may be arranged on a rail, and the lift line may be configured to raise and lower the boom along the rail. Moreover, the boom may be configured to pivot between a first position, where a cantilevered end of the boom is aligned with the opening in the drill floor, and a second position, where the cantilevered end of the boom is positioned near a racking board.

The present disclosure, in one or more embodiments, additionally relates to a method of handling drill collar for use in a drilling operation. The method may include hoisting a collar stand using a lift arm, manipulating a position of a first end of the collar stand using a first pipe handler, and manipulating a second end of the collar stand using a second pipe handler. The lift arm may include a boom having a first end and a second end, the first end configured for pivotably coupling to a mast of a drilling rig. The lift arm may additionally include a pipe engaging element coupled to the boom and configured to engage with a collar stand. A lift line may be configured to raise and lower the pipe engaging element. The first pipe handler may be a robotic pipe handler and may be arranged on a drill floor of the drilling rig. The second pipe handler may be a robotic pipe handler as well, and may be arranged on a racking board of the drilling rig. In some embodiments, hoisting the collar stand may include coupling the pipe engaging element to the collar stand at the second end and raising the pipe engaging element via the lift line.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to devices, systems, and methods for pipe handling operations. In particular, the present disclosure relates to devices, systems, and methods for handling drill collar, drill pipe, and/or drilling pipe or conduit to facilitate trip in and trip out operations. In some embodiments, the present disclosure relates to a drilling rig having a lift arm, which may be an auxiliary lift arm provided in addition to a primary lifting cable system of the drilling rig. The lift arm may be configured to hoist and/or manipulate drill collar, drill pipe, or other drilling pipe or conduit. The lift arm may be coupled to a mast of the drilling rig and may have a cantilevered boom extending therefrom. The boom may be pivotably coupled to the mast, and may be configured to pivot such that a swinging end of the boom may move between alignment, or near alignment, with well center and a racking board. The lift arm may additionally have a pipe engaging element secured to and/or extending from the boom. The pipe engaging element may be configured to couple to stands or lengths of drilling pipe. The pipe engaging element may be raised and lowered together with or relative to the boom via a lift line. In some embodiments, the lift arm may operate in conjunction with one or more pipe handlers, which may be robotic pipe handlers, and a primary lifting system such as a hoisting cable reeved between a traveling block and crown block, to handle drilling pipe during trip in and trip out operations. It is to be appreciated that while the term drill pipe may be used to refer to conventional drill pipe that is not as heavy as drill collar, the term drill pipe may also be used to refer, generally, to all types of drill pipe including drill collar. In many cases, throughout this specification and, in particular, because the presently disclosed lift arm is particularly advantageous for manipulating drill collar, the term drill pipe as used herein generally includes drill collar.

Figure 1:
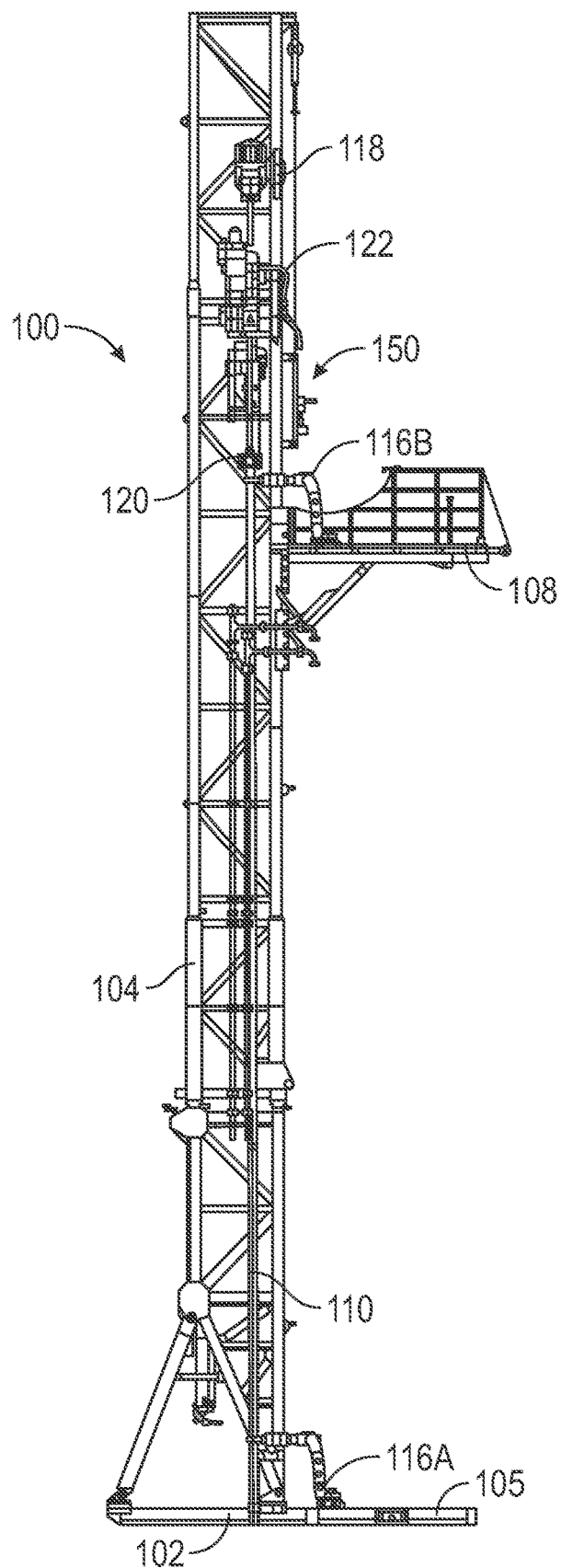
FIG. 1 is a side view of a drilling rig of the present disclosure, according to one or more embodiments.

Turning now to FIG. 1, a drilling rig 100 of the present disclosure is shown. The drilling rig 100 may be configured for onshore oil drilling in some embodiments. However, in other embodiments, a drilling rig of the present disclosure may be configured for other drilling operations, including offshore drilling. The drilling rig 100 may be configured to be a mobile or stationary rig. The drilling rig 100 may generally have a drill floor 102, a mast 104, and a pipe handling system.

The drill floor 102 may include a platform positioned above or over a well and supported by a substructure. The drill floor 102 may be configured to provide a working space for drilling operations and/or a storage space for equipment, drill pipe, and/or drill collar. The drill floor 102 may have an opening arranged at or near well center for accessing the well during drilling operations. The drill floor 102 may additionally include a setback area 105 configured for receiving and/or storing lengths of drill pipe and drill collar. For example, lengths of drill pipe and drill collar may be stored as single stands, or may be combined into double stands, triple stands, quadruple stands, or other sized stands, and positioned on end in the setback area 105.

The mast 104 may extend from the drill floor 102 with a height suitable for accommodating and/or building single, double, triple, quadruple, or other sized drill pipe stands. For example, the mast 104 may have a height of up to 50 feet, 100 feet 150 feet, 200 feet, or more. In other embodiments, the mast 104 may have any other suitable height or height range. In some embodiments, a racking board 108 may extend from the mast 104. The racking board 108 may be configured for managing the top portion of pipe stands to maintain or store stands of pipe in a generally organized manner. In some embodiments, pipe stands may be stored with a first or lower end arranged on the drill floor 102 in the setback area 105, and a second end or upper end extending in or through a racking board 108. The racking board 108 may extend laterally from the mast 104 at height of between approximately 30 feet and approximately 200 feet from a ground or pad surface, or between approximately 40 feet and approximately 150 feet, or between approximately 50 feet and approximately 100 feet. In other embodiments, the racking 108 board may extend from the mast 104 at any other suitable height.

Figure 2:
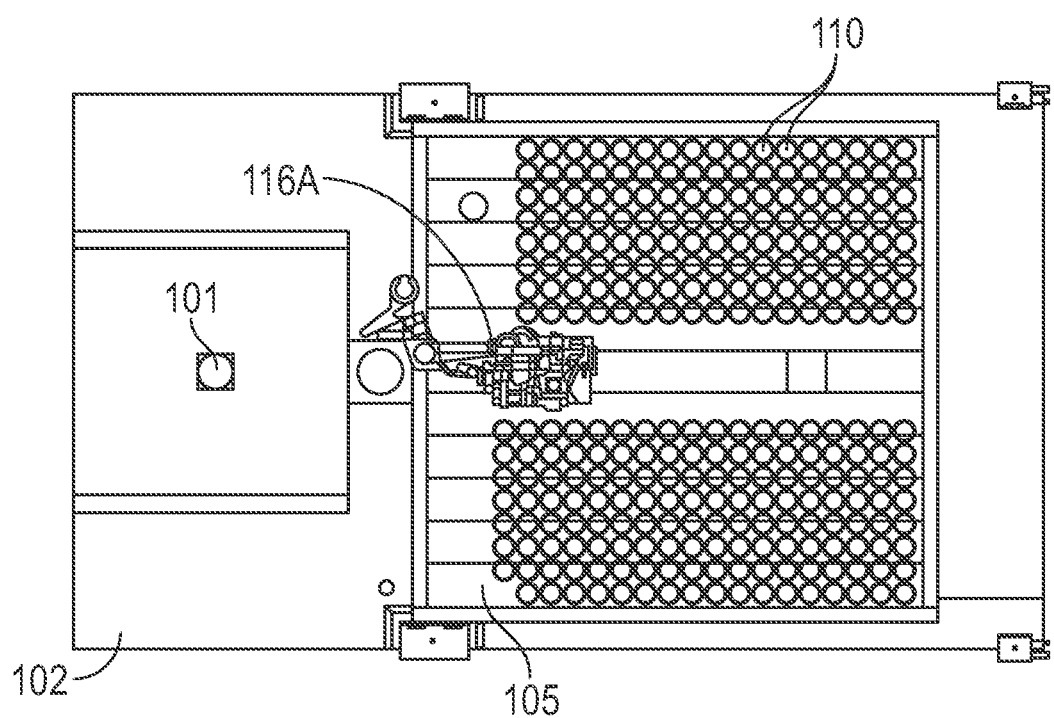
FIG. 2 is an overhead view of a pipe handler arranged on a drill floor of the present disclosure, according to one or more embodiments.
Figure 3A:
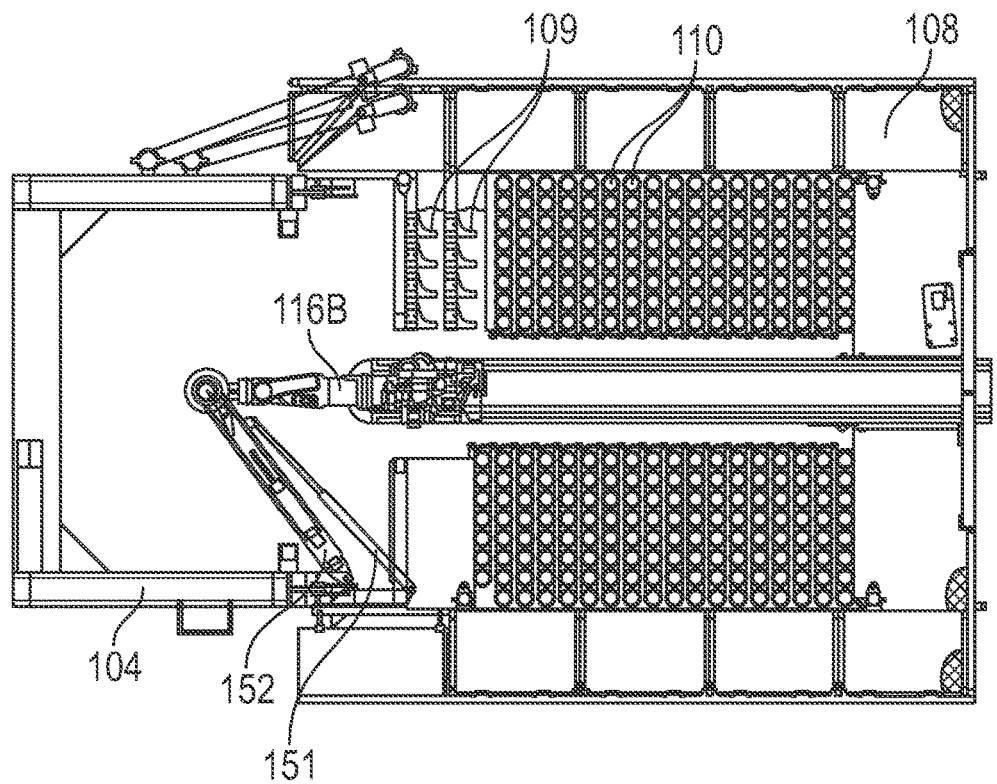
FIG. 3A is an overhead view of a pipe handler arranged on a racking board and a lift arm of the present disclosure in a first position, according to one or more embodiments.
Figure 3B:
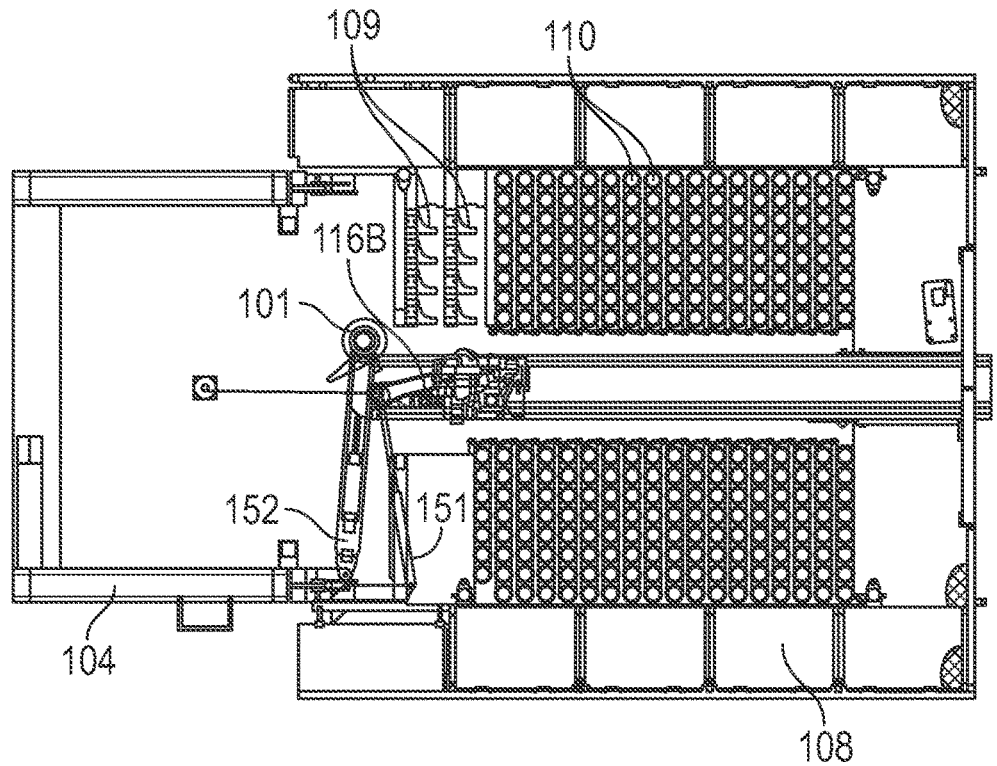
FIG. 3B is another overhead view of a pipe handler arranged on a racking board and a lift arm of the present disclosure in a second position, according to one or more embodiments.

FIGS. 2-3B illustrate a plurality of pipe stands 110, which may include drill pipe and/or drill collar stands, arranged between the drill floor 102 and racking board 108. In particular, FIG. 2 shows an overhead view from above the drill floor 102, but below the racking board 108. As shown in FIG. 2, pipe stands 110 may be arranged on end in the setback area 105 of the drill floor 102. FIGS. 3A and 3B show overhead views from above the racking board 108 showing the pipe stands 110 arranged on end in the setback area 105 and extending through the racking board. The racking board 108 may include a plurality of fingers 109, which may be arranged in a parallel configuration, configured to receive stands 110 of pipe and/or drill collar therebetween so as to maintain the stands in an upright, on-end configuration. The fingers 109 of the racking board 108 may operate to maintain stands of pipe in organized rows or columns. In particular, the racking board 108 may be configured such that a plurality of pipe stands 110 may be arranged in a row or column between each pair of racking board fingers 109. In some embodiments, pipe stands 110 may be added to the racking board 108 as they are built. The racking board 108 may maintain the pipe stands 110 in their on-end configuration on the setback area 105 until they are added to a drill string during a trip in operation. Moreover, during a trip out operation, pipe stands 110 may be removed from the drill string and added to the racking board 108 until they are either tripped back into the well or disassembled. The racking board 108 may additionally or alternatively be configured to store pipe stands 110 during other operations as well.

With reference back to FIG. 1, the drilling rig may additionally include systems and/or devices for pipe handling operations, which may include trip in and trip out operations, stand building, and/or other operations. For example, the drilling rig may include a lifting system, which may be a primary lifting system, and one or more pipe handlers. The pipe handling system may additionally include one or more mechanisms, such as an iron roughneck, for coupling and/or decoupling lengths of drill pipe.

The primary lifting system may be configured for supporting the load of a pipe stand 110 and/or drill string during a trip in, trip out, and/or other pipe handling operation. The lifting system may include a drill line or cable extending from a draw works. The drill line may be reeved between a crown block, arranged at or near a top of the mast 104, and a traveling block 118, arranged beneath the crown block and within the mast. In some embodiments, the drill line may be a main or primary line that may be otherwise configured for use during drilling operations using a top drive 122, for example. In some embodiments, a pipe elevator 120 and/or top drive 122 may be coupled to the traveling block 118.

In some embodiments, the rig may include one or more pipe handlers, which may be robotic pipe handlers 116. Each robot or robotic pipe handler 116 may be configured to manipulate drill pipe or drill collar lengths or stands 110, and/or other piping. The robots 116 may be programmable and/or operable manually or partially manually. A rig of the present disclosure may have one, two, three, four, or any other suitable number of robots 116. For example, a pipe handling system of the present disclosure may include a first robot 116a arranged on or near the drill floor 102 (i.e., a drill floor robot or drill floor pipe handler), and a second robot 116b arranged on or near the racking board 108 (i.e., a racking board robot or racking board pipe handler). In some embodiments, two robots 116 may be generally aligned with one another. For example, the racking board robot 116b may be centrally arranged on a racking board 108, and the drill floor robot 116a may be positioned in the setback area 105 of the drill floor 102 beneath and generally aligned with the racking board robot. In other embodiments, robots 116 may be positioned differently, but may generally be arranged in corresponding configurations. In some embodiments, robots 116 may be arranged in corresponding pairs, with an upper or racking board robot 116b configured to handle an upper end of piping and a corresponding lower or drill floor robot 116a configured to handle a lower end of piping. In some embodiments, each robot may be, or may be similar to, those described in International Patent Application Number PCT/US2019/044974, entitled Devices, Systems, and Methods for Robotic Pipe Handling, filed Aug. 2, 2019, the content of which is hereby incorporated by reference herein in its entirety.

FIG. 2 shows an embodiment of a robot 116a arranged on the drill floor 102, according to one or more embodiments. The drill floor robot 116a may be configured for handling a first end of pipe stands 110, the first end being an end positioned closest the drill floor 102 when the pipe stands are arranged within the racking board 108. In some embodiments, the first end of the pipe stand 110 may be referred to as a lower end. FIGS. 3A and 3B show an embodiment of a robot 116b arranged on the racking board 108. The racking board robot 116b may be configured for handling a second end of pipe stands 110, the second end being an end positioned closest the racking board 108 when the pipe stands are arranged within the racking board. In some embodiments, the second end of the pipe stand 110 may be referred to as an upper end.

In some embodiments, the rig may additionally include a lift arm 150 with a boom 152 and cylinder 151, which may be configured for lifting drill collar and/or drill pipe. The boom 152 and cylinder 151 of lift arm 150 may be seen in an overhead view in FIGS. 3A and 3B, and may further be appreciated with respect to FIGS. 4-6. The lift arm 150 may extend from the mast 104, for example, and may be configured for supporting a dead load of a length or stand of drill collar or drill pipe, or a portion of such load, during trip in and/or trip out operations. The lift arm 150 may support or hold a length of drill collar or drill pipe while the pipe handlers 116 operate to manipulate a position of the collar or pipe. In this way, the lift arm 150 may be configured for assisting in the handling or manipulation of drill collar or drill pipe during trip in, trip out, and/or other handling operations. Additionally, the lift arm 150 may be configured to swing between at least a first position and a second position so as to assist in handling or manipulating drill collar or drill pipe between well center and the racking board, for example. In some embodiments, the lift arm 150 may include a boom 152, a pair of boom support members 154, a pipe engaging element 156, and a lift line 158.

The boom 152 may extend laterally from a column or member of the mast 104 in a cantilevered configuration. In some embodiments, the boom 152 may extend generally parallel with the drill floor 102. The boom 152 may extend from the mast 104 at a height so as to be arranged above the racking board 108. The boom 152 may have a first end, secured to the mast 104, which may be a secured end. The boom 152 may have a second end, opposing the first end, which may be a free end or a cantilevered end.

The secured end of the boom 152 may be secured to the mast 104 by any suitable means. In some embodiments, the boom 152 may be pivotably coupled to the mast 104. In particular, the boom 152 may be configured to pivot about an axis extending parallel to the mast 104 and/or extending perpendicular to a longitudinal axis of the boom. In some embodiments, the boom 152 may be configured to pivot or swing between at least a first position and a second position. FIG. 3A shows an overhead view of the boom 152 arranged in a first position, according to one or more embodiments. In the first position, the boom 152 may be arranged with the free end generally positioned above, or aligned with, well center 101. FIG. 3B shows an overhead view of the boom 152 arranged in a second position, according to one or more embodiments. In the second position, the boom 152 may be arranged with the free end generally positioned above the racking board 108 or directed toward the racking board. In particular, in the second position, the free end of the boom 152 may be arranged nearer to the racking board 108 than the well center 101. The first and second positions may be separated by an angle of between approximately 10 degrees and approximately 90 degrees in some embodiments. Moreover, the boom 152 may be configured to pivot to any suitable location or position between the first and second positions, as desired or needed. In some embodiments, the boom 152 may further be configured to swing or pivot to a third position, which may be a storage position, which may be separated from the first position by a larger angle than that of the second position. In other embodiments, the boom 152 may be configured to pivot or swing to alternative or additional positions or degrees of rotation. Overall, the boom 152 may be configured to pivot or swing up to a maximum of 360 degrees, 270 degrees, 180 degrees, 135 degrees, 90 degrees, or 45 degrees.

In some embodiments, the boom 152 may be driven about its pivoted connection to the mast 104 via one or more hydraulic cylinders 151. As shown for example in FIGS. 3A and 3B, a hydraulic cylinder 151 may be arranged between the mast 104 and the boom 152, such that extension and retraction of the cylinder may drive the boom 152 to pivot about its connection to the mast 104. The hydraulic cylinder 151 may be mounted to the mast 104 at or substantially near a same height as the boom 152, and may be mounted adjacent to the boom, such that extension and retraction of the cylinder causes the boom to pivot about a vertical or generally vertical axis of rotation. In other embodiments, other suitable mechanisms may be used to drive movement of the boom 152 about its pivoted connection to the mast 104.

The boom 152 may have a length configured to reach well center 101, so as to allow the lift arm 150 to engage with a pipe stand or collar stand at well center. In some embodiments, the boom 152 may have a length of between approximately 3 feet and 12 feet, or between approximately 5 feet and 10 feet, or a boom 152 having a length of approximately 7 feet may be used. In other embodiments, the boom 152 may have any other suitable length. Moreover, the boom 152 may be extendable or telescoping in some embodiments. In particular, the boom 152 may have an outer sheath configured to nestably engage with an inner shaft. The inner shaft may extend from the outer sheath to lengthen the boom 152 along its longitudinal axis. Such lengthening or telescoping may allow the lift arm to reach further toward well center 101 and/or further toward storage locations of the racking board 108. In some embodiments, a hydraulic cylinder 153 may be coupled to each of the outer sheath and inner shaft and may be configured to extend and retract the boom 152. This may be seen, for example, in FIGS. 6A and 6B where the boom is shown in the retracted position.

Figure 4:
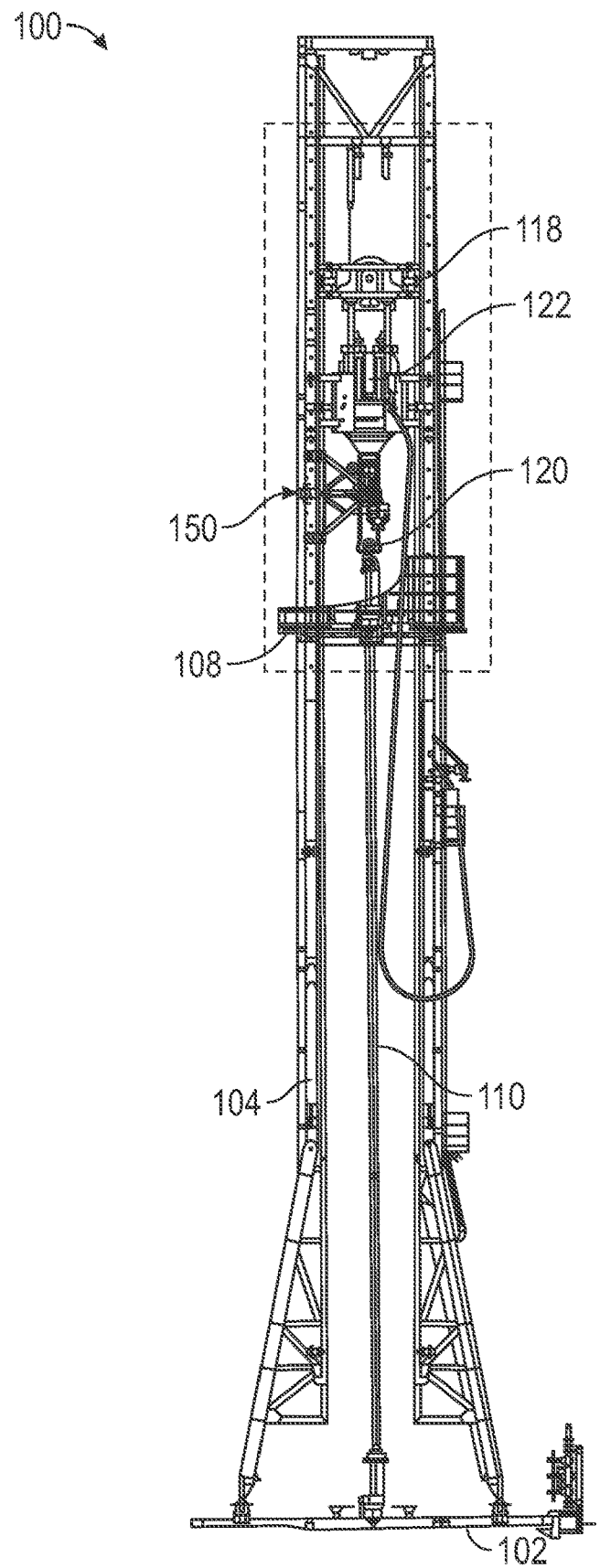
FIG. 4 is a front view of the drilling rig of FIG. 1, according to one or more embodiments.
Figure 5:
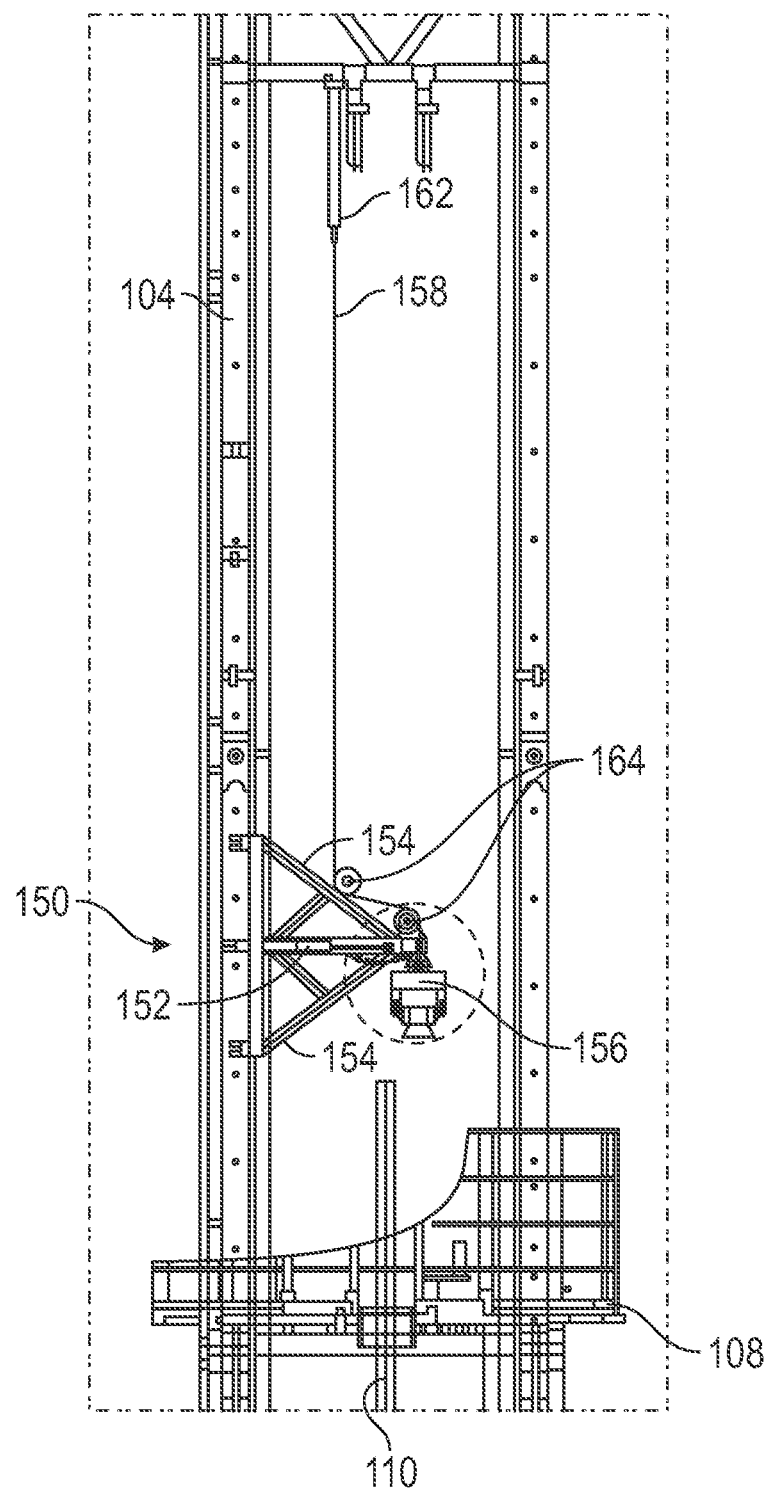
FIG. 5 is a close-up front view of the drilling rig of FIG. 1 showing a lift arm extending from the mast, according to one or more embodiments.

As shown in FIGS. 4 and 5, the lift arm 150 may include one or more boom support members 154 extending between the boom 152 and the mast 104. The support members 154 may be configured to provide stiffening support to the boom 152 and may help stabilize the free end of the boom, particularly when the lift arm 150 is loaded. For example, one or more members 154 may extend between the mast 104 and the free end of the boom 152. Each support member 154 may be pivotably coupled to the mast 104 so as to pivot or swing together with the boom 152 as the boom pivots. Where the boom 152 is extendable, the support members 154 may couple to the outer sheath of the boom.

Figure 6A:
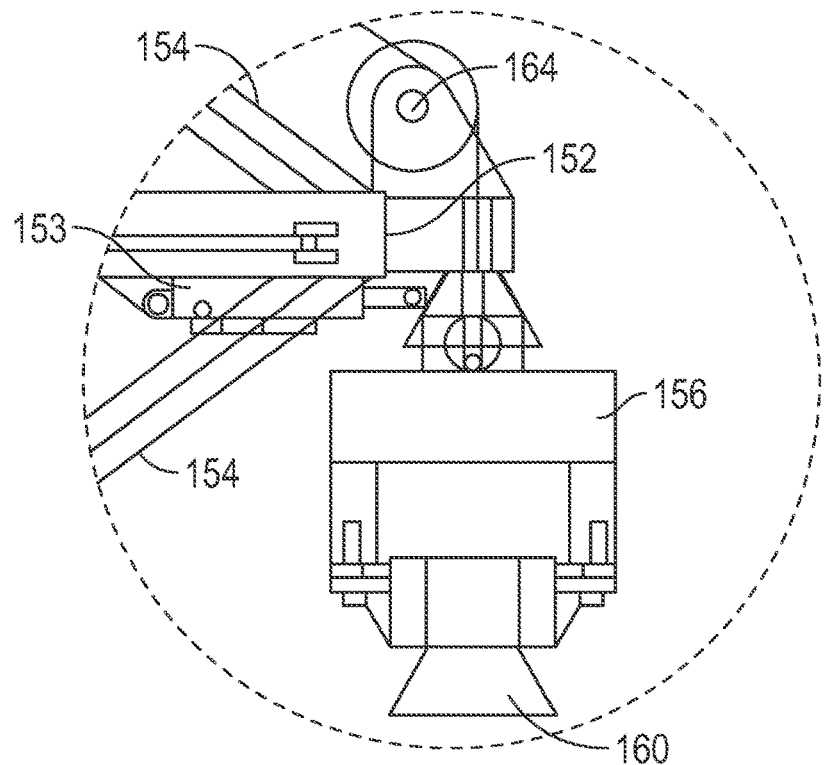
FIG. 6A is a close-up view of a pipe engaging element of a lift arm of the present disclosure, according to one or more embodiments.
Figure 6B:
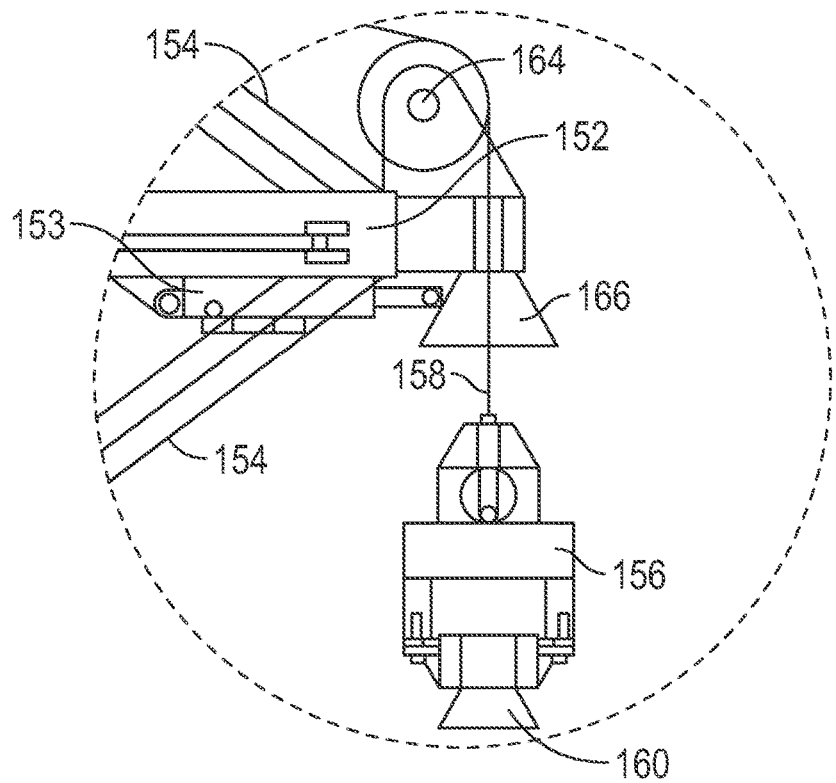
FIG. 6B is another close-up view of a pipe engaging element of a lift arm of the present disclosure, according to one or more embodiments.
Figure 7:
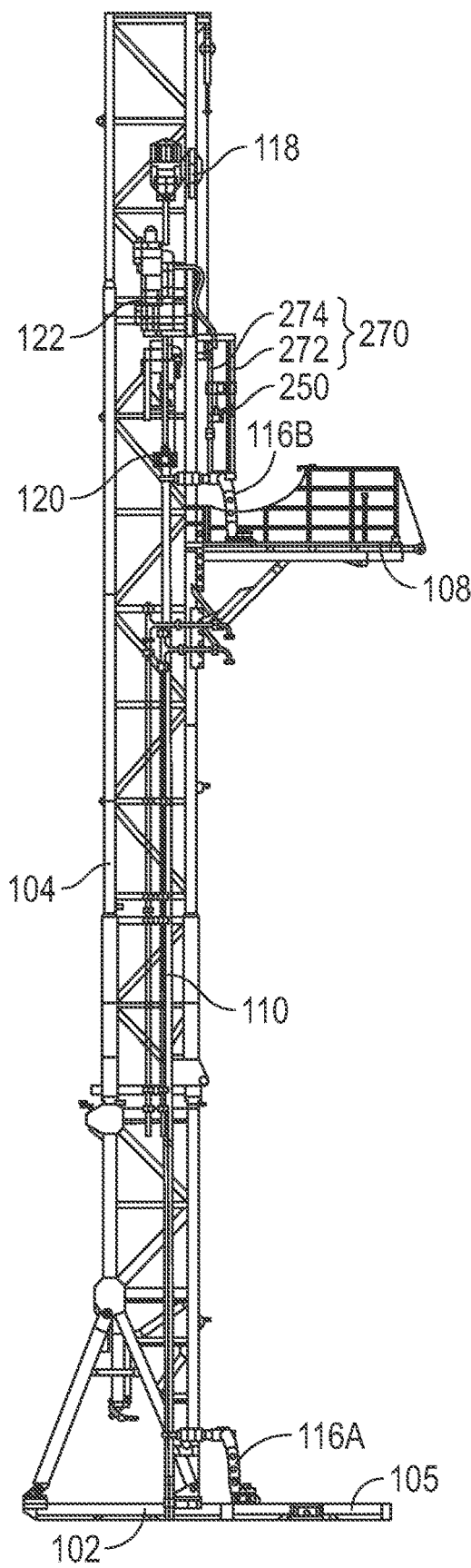
FIG. 7 is a side view of a drilling rig of the present disclosure, according to one or more embodiments.
Figure 8:
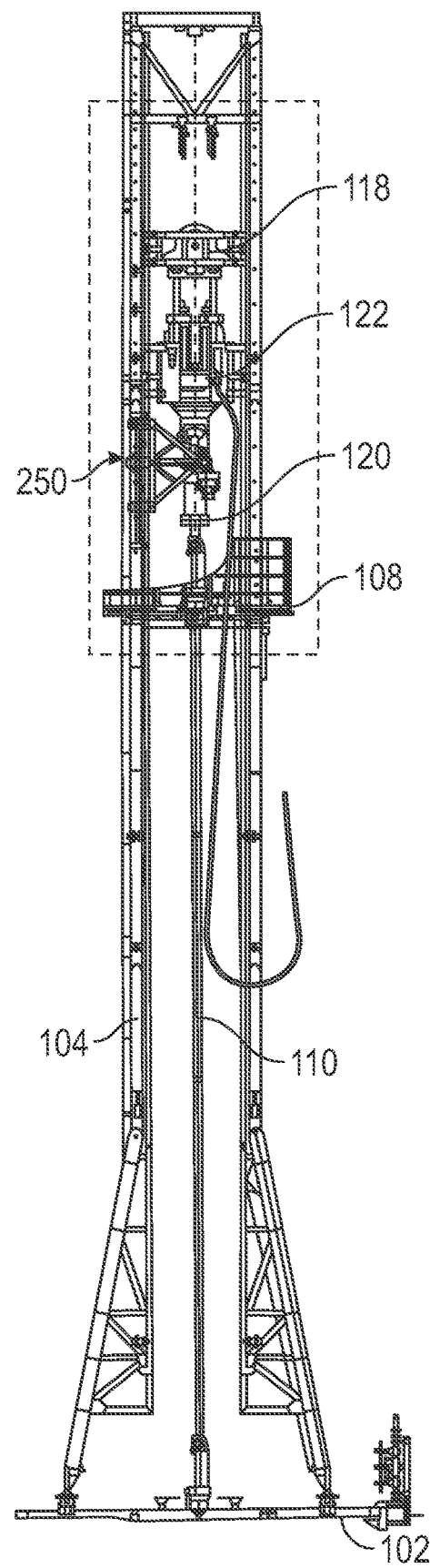
FIG. 8 is a front view of the drilling rig of FIG. 7, according to one or more embodiments.

The pipe engaging element 156 may be configured for engaging with a length or stand of drill collar or drill pipe. In particular, the pipe engaging element 156 may be configured to couple to an end of a length of pipe or collar. In some embodiments, the pipe engaging element 156 may be or include a collar clamp or other type of clamping element. Additionally or alternatively, the pipe engaging element 156 may be or include a pipe elevator. It is to be appreciated that different pipe engaging elements may be sized and configured for different types or sizes of piping, and in some embodiments, pipe engaging elements may be interchanged. As may be appreciated with respect to FIGS. 6A and 6B, in some embodiments, the pipe engaging element 156 may have a pipe guide 160 configured to guide a drill collar or pipe to a coupling position for engagement with the engaging element. The guide 160 may be a bell-shaped guide for example, having a mouth and a tapered sidewall. The pipe engaging element 156 may be arranged at or near the free end of the boom 152. As shown in FIGS. 6A and 6B, the pipe engaging element 156 may be positioned below the boom 152. In some embodiments, the pipe engaging element 156 may be coupled directly to the boom 152. However, in other embodiments, the pipe engaging element 156 may be arranged at an end of a lift line 158, and may be configured to extend below the boom 152 via the lift line.

The lift line 158 may be configured for raising and lowering the pipe engaging element 156 with respect to the boom 152 or, as discussed in more detail below, for raising and lowering the lift arm as a whole. The lift line 158 may couple at a first end to the pipe engaging element 156 and may couple at a second, directly or indirectly, to the mast 104. In some embodiments, the line 158 may couple to the mast 104 via a hydraulic lift cylinder 162. The cylinder 162 may be configured to extend and retract, so as to lower and raise the pipe engaging element 156 relative to the boom 152. In other embodiments, the lift line 158 may couple to the mast 104 via a winch or drawworks configured to operatively draw up and release the line. As shown in FIG. 5, in some embodiments, the lift line 158 (via the hydraulic lift cylinder 162, for example) may couple to the mast 104 at a generally horizontal beam or member, the generally horizontal beam or member being parallel with the drill floor 102. Moreover, the line 158 may be coupled to the mast 104 at a location arranged vertically higher above the drill floor 104 than the location of the lift arm 150. Additionally, the lift cylinder 162 may be arranged so as to be generally aligned with the lift arm 150. Such positioning may help facilitate smooth draw up and release of the lift line 158 via the cylinder 162, a drawworks, or another suitable mechanism.

However, it is to be appreciated that in other embodiments, the lift line 158 may couple to the mast 104 at a different location or position.

In some embodiments, the lift line 158 may be arranged across one or more pulleys or sheaves 164 to as to direct the lift line and further facilitate smooth raising and lower of the pipe engaging element 156. As shown in FIG. 5 for example, one or more sheaves 164 may be arranged on the lift arm 150. A first sheave 164 may be arranged on a support member 154. A second sheave 164 may be arranged on the boom 152. Where the boom 152 is extendable, the second sheave 164 may be arranged at a free end of the inner shaft. In this way, as the boom 152 extends, the second sheave (arranged on the inner shaft) may move away from the first sheave (arranged on the support member 154).

It is to be appreciated that, in other embodiments, other mechanisms may be used to raise and lower the pipe engaging element 156. For example, a hydraulic cylinder may be arranged between the pipe engaging element 156 and the boom 152 in some embodiments, such that extension of the cylinder may cause the pipe engaging element to extend below the boom. In still other embodiments, other mechanisms may be used as well.

With reference to FIGS. 6A and 6B, in some embodiments, a stabilizer, such as a bell-shaped stabilizer 166, may be arranged and configured to help minimize lateral movement of the pipe engaging element 156. The stabilizer 166 may be arranged at the free end of the boom 152 and may be directly aligned with the pipe engaging element 156. In some embodiments, the stabilizer 166 may have two open ends, and the lift line 158 may pass through the stabilizer. For example, the lift line 158 may pass from the second sheave 164 arranged on the boom 152, through the stabilizer 166, to reach the pipe engaging element 156. In some embodiments, the stabilizer may be sized and configured to receive a portion of the pipe engaging element 156. For example, the stabilizer 166 may be sized and shaped to receive an upper attachment block 168, where the line 158 attaches to the pipe engaging element 156. When the lift line 158 is withdrawn to raise the pipe engaging element 156, the attachment block 168 may nest within the stabilizer 166, thus mitigating lateral or swing motion of the pipe engaging element. As the pipe engaging element 156 is lowered from the boom 152, the stabilizer 166 may continue to reduce lateral or swing motion of the portion of the line 158 extending below the boom.

In some embodiments, in addition to or alternative to a lift line, a lift arm of the present disclosure may have other means of vertical movement. For example, in some embodiments, the boom itself may be configured to move toward and away from the drill floor, which may further assist in drill pipe and collar hoisting operations. FIGS. 7-10 show one embodiment of a lift arm 250 having a boom slidable along the mast 104. In particular, the lift arm 250 may include a guide rail 270 configured to allow the boom 252 to slide along the mast 104, toward and away from the drill floor 102. FIGS. 9 and 10 show close-up views of the lift arm 250. As shown, the lift arm 250 may include a rail 270, a boom 252, a pair of boom support members 254, a pipe engaging element 256, and a lift line 258.

The rail 270 may include a track 272, a sliding member 274, and one or more track engaging elements 276. The track 272 may be arranged on the mast 104 and may be configured to provide a path along which the boom 252 can slide. The track 272 may be arranged vertically and may be positioned along a member of the mast 104 that extends upward from the drill floor 102. In some embodiments, the track 272 may have a stop 273 at each of two ends, such as an upper end and a lower end. The two stops 273 may be configured to provide hard stops for sliding movement of the boom 252 to ensure the boom does not slide off of the rail. The length of the track 272 between the two stops 273 may define a length of travel over which the boom 252 and/or other sliding components may slide along the mast 104. In one or more embodiments, the rail may have a length between approximately 4 feet and 20 feet, or between approximately 8 feet and 16 feet, or between approximately 10 feet and 12 feet. Still other rail lengths may be provided. In one or more other embodiments, the a vertically swinging hinged arm may be provided in lieu of a sliding rail.

The boom 252 and each of the boom support members 254 may extend from the sliding member 274. The sliding member 274 may be configured to engage with, and slide along, the track 272, so as to cause the boom 252 and support members 254 to slide toward and away from the drill floor 102. The sliding member 274 may be arranged with a longitudinal axis parallel with that of the track 272. The sliding member 274 may have a length shorter than that of the track 272 and sized to extend between the two boom support members 254. The sliding member 274 may engage with the track 272 via one or more track engaging elements 276. Each track engaging element 276 may be or include one or more rollers or other elements configured to slidingly engage with the track 272, thus allowing the sliding member 274 to freely slide toward and away from the drill floor 102. As shown in FIGS. 9 and 10, in some embodiments, the sliding member 274 may have three track engaging elements 276. For example, a track engaging element 276 may align with each of the boom 252 and each of the two boom support members 254. However, in other embodiments, the sliding member 274 may have one, two, four, five, or any other suitable number of track engaging elements 276. Moreover, in some embodiments, the boom 252 and/or the boom support members 254 may couple directly to track engaging elements 276.

Figure 9A:
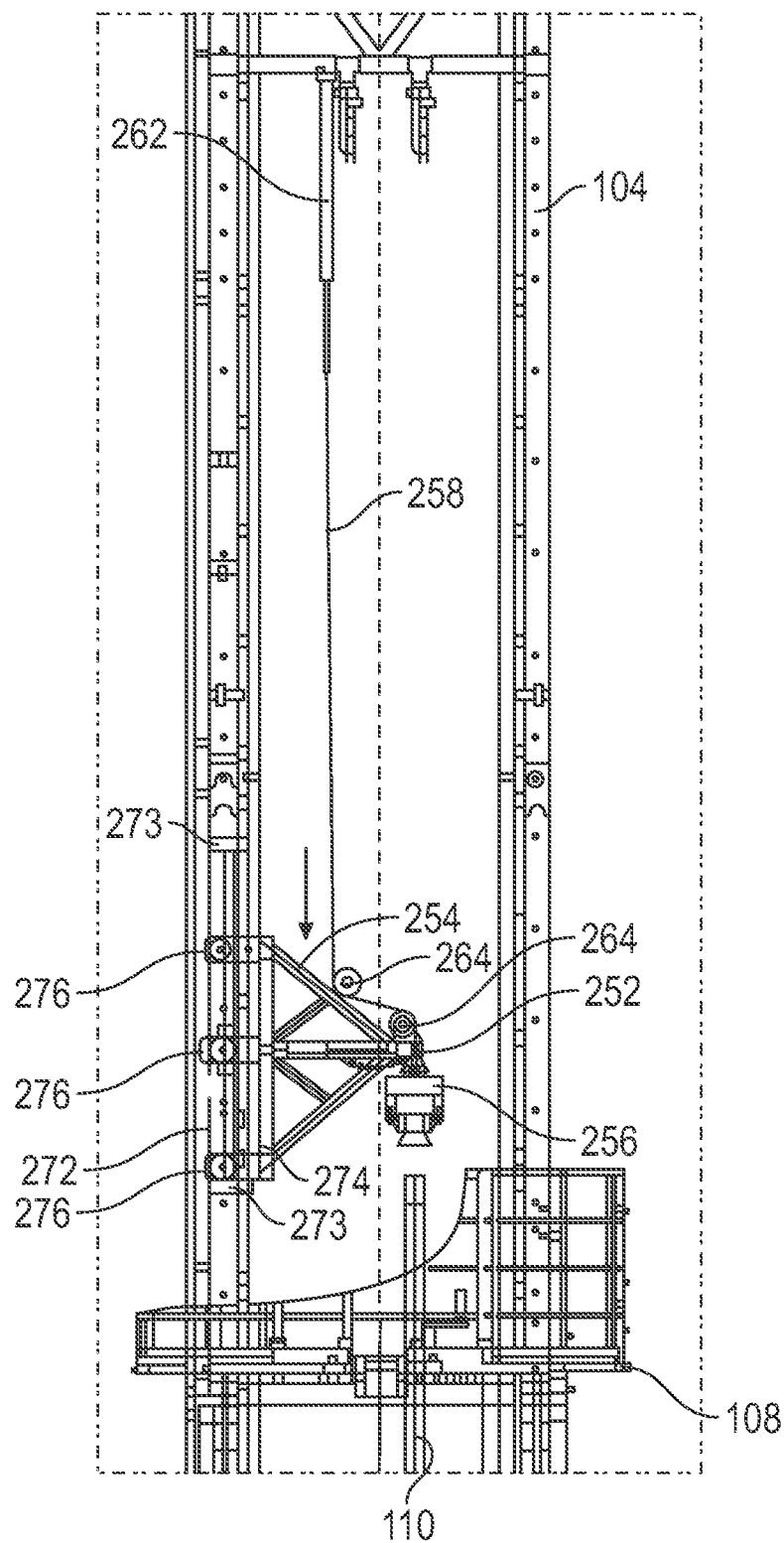
FIG. 9A is a close-up front view of a portion of the drilling rig of FIG. 7, showing a lift arm extending from the mast, according to one or more embodiments.
Figure 10A:
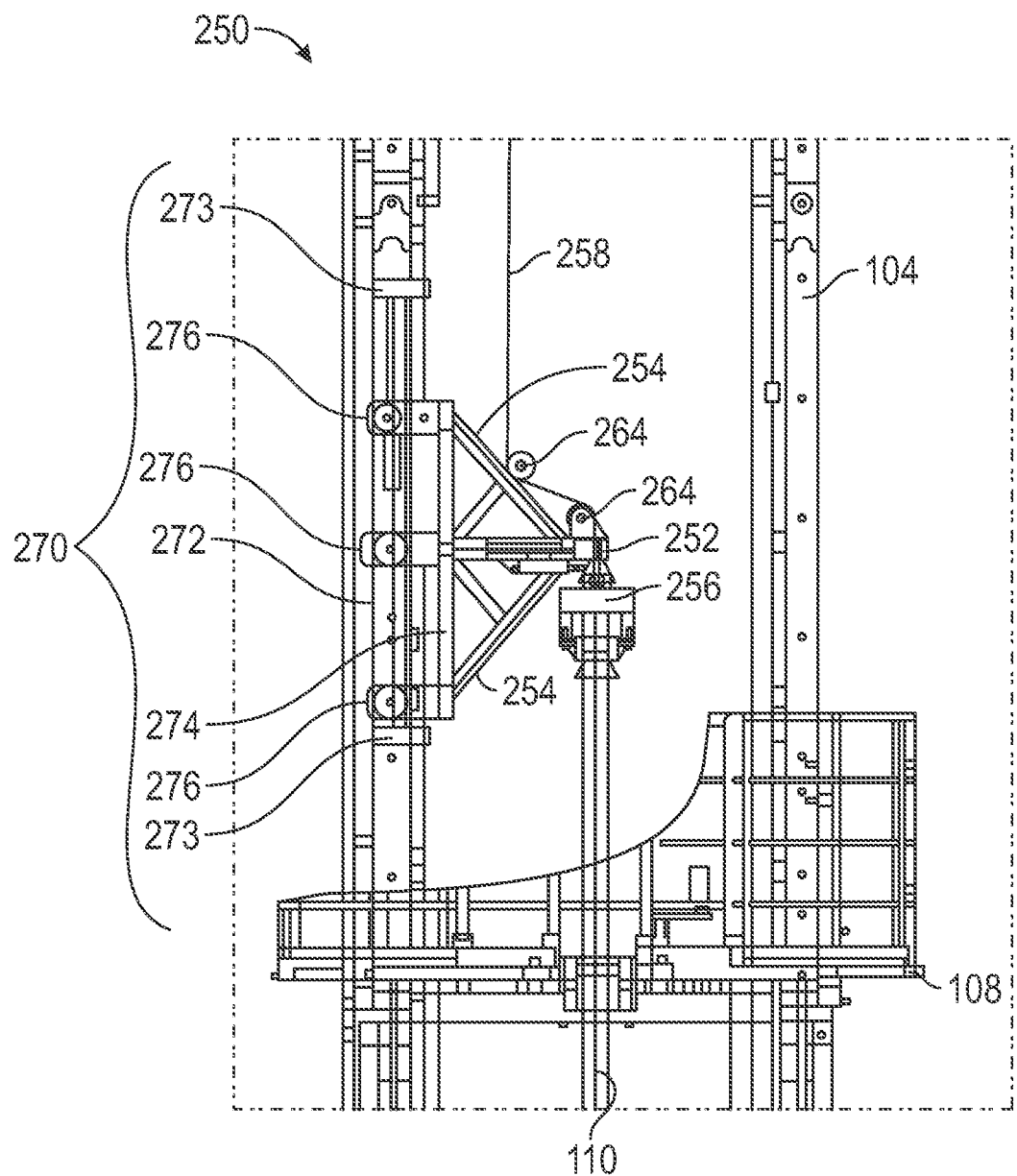
FIG. 10A is another close-up front view of the drilling rig of FIG. 7, showing the lift arm extending from the mast, according to one or more embodiments.

The boom 252, boom support members 254, pipe engaging element 256, and lift line 258 may be similar to those described above. However, in some embodiments, the lift line 258 may operate to raise/lower the boom 252 itself instead of or in addition to the pipe engaging element 256. In particular, as the lift line 258 extends via, for example, a cylinder 262, weight of the boom 252, boom support members 254, and pipe engaging element 256 may together cause the sliding member 274 to slide downward along the track 272 toward the drill floor 102. FIG. 9A shows the sliding member 274 at a lowest point along the track 272 against a lower stop 273. Once the sliding element 274 stops at a lowest point of the track 272 via a lower stop 273, further extension of the lift line 258 may cause the pipe engaging element 256 to extend downward toward the drill floor 102. FIG. 10A shows the sliding member 274 at a lowest point along the track 272 and further shows the pipe engaging element 256 extending downward below the boom 252 via the lift line 258.

Figure 9B:
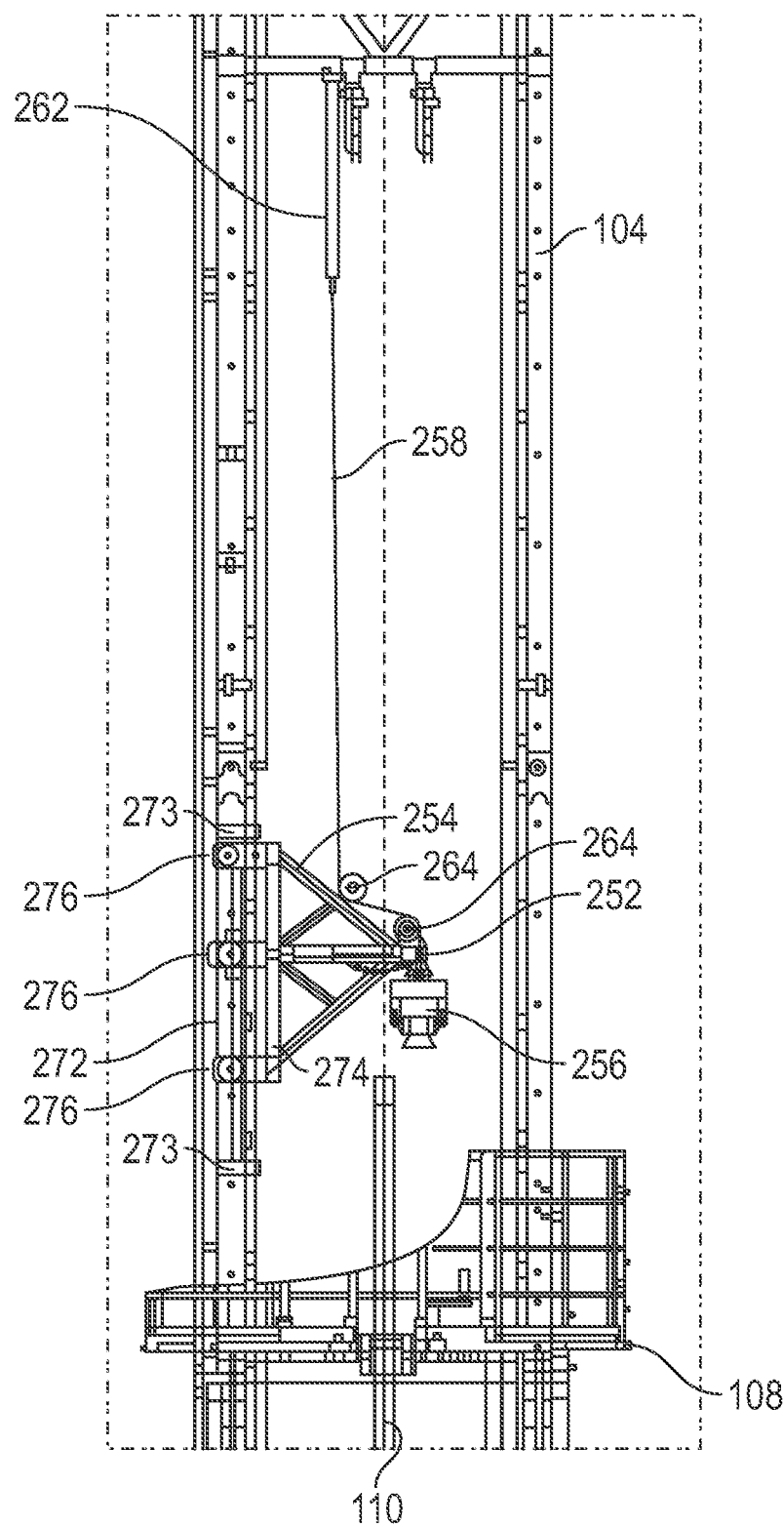
FIG. 9B is another close-up front view of a portion of the drilling rig of FIG. 7, showing the lift arm extending from the mast, according to one or more embodiments.
Figure 10B:
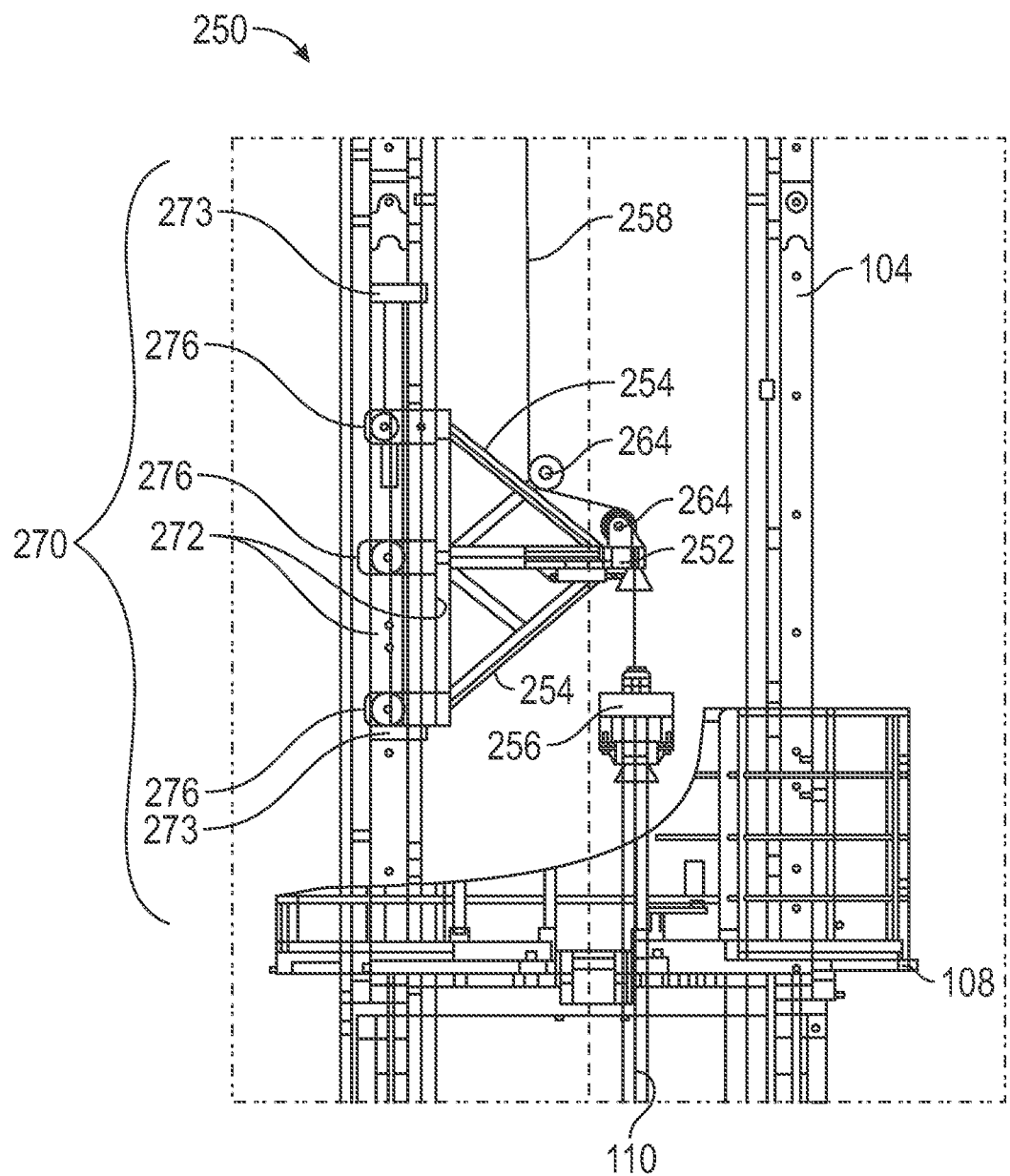
FIG. 10B is another close-up front view of the drilling rig of FIG. 7, showing the lift arm extending from the mast, according to one or more embodiments.

As the lift line 258 withdraws or retracts, the pipe engaging element 256 may be withdrawn upward toward the boom 252. FIG. 10B shows the sliding element 274 still at a lowest point along the track 272, but with the pipe engaging element 256 withdrawn up to the boom 252 while engaging with a collar stand 110. Once the pipe engaging element 256 is fully withdrawn toward the boom 252, further retraction or withdrawal of the lift line 258 may cause the sliding element 274 to slide upward along the track 272, thus sliding the boom 252 upward and away from the drill floor 102. FIG. 9B shows the sliding element 274 pulled to a highest point along the track 272 via the lift line 258.

It is to be appreciated that, in other embodiments, other mechanisms may be used for raising/lowering the boom 252. In some embodiments, the pipe engaging element 256 may be fixed with respect to the boom 252, and the boom may be configured to slide a greater distance along the mast 104. For example, the rail 270 may have a longer track 272. In some embodiments, different mechanisms may be used to raise/lower each of the boom 252 and the pipe engaging element 256. For example, while a lift line and first hydraulic cylinder may control raising and lower of the pipe engaging element 256, a second hydraulic cylinder, with or without a second lift line, may extend between the mast and the sliding element 274 to raise and lower the boom 252.

In use, a lift arm of the present disclosure may facilitate handling operations of drill collar and/or drill pipe above the drill floor. For example, the lift arm may facilitate moving a drill collar or drill pipe length or stand from well center to a stored or racked position between the racking board and setback area (trip out operation). Additionally, the lift arm may facilitate moving a drill collar or drill pipe length or stand from a stored or racked position to well center in order to connect to a drill string (trip in operation). In both trip in and trip out operations, the lift arm may operate to grasp an upper end of a drill collar or pipe, and may maneuver drill collar or pipe above the drill floor to facilitate hand-off between a pipe handler and a top drive pipe elevator or other primary lifting mechanism. In this way, the lift arm may support a dead load of the pipe or collar, and may additionally move the drill collar between the racking board and well center.

Figure 11:
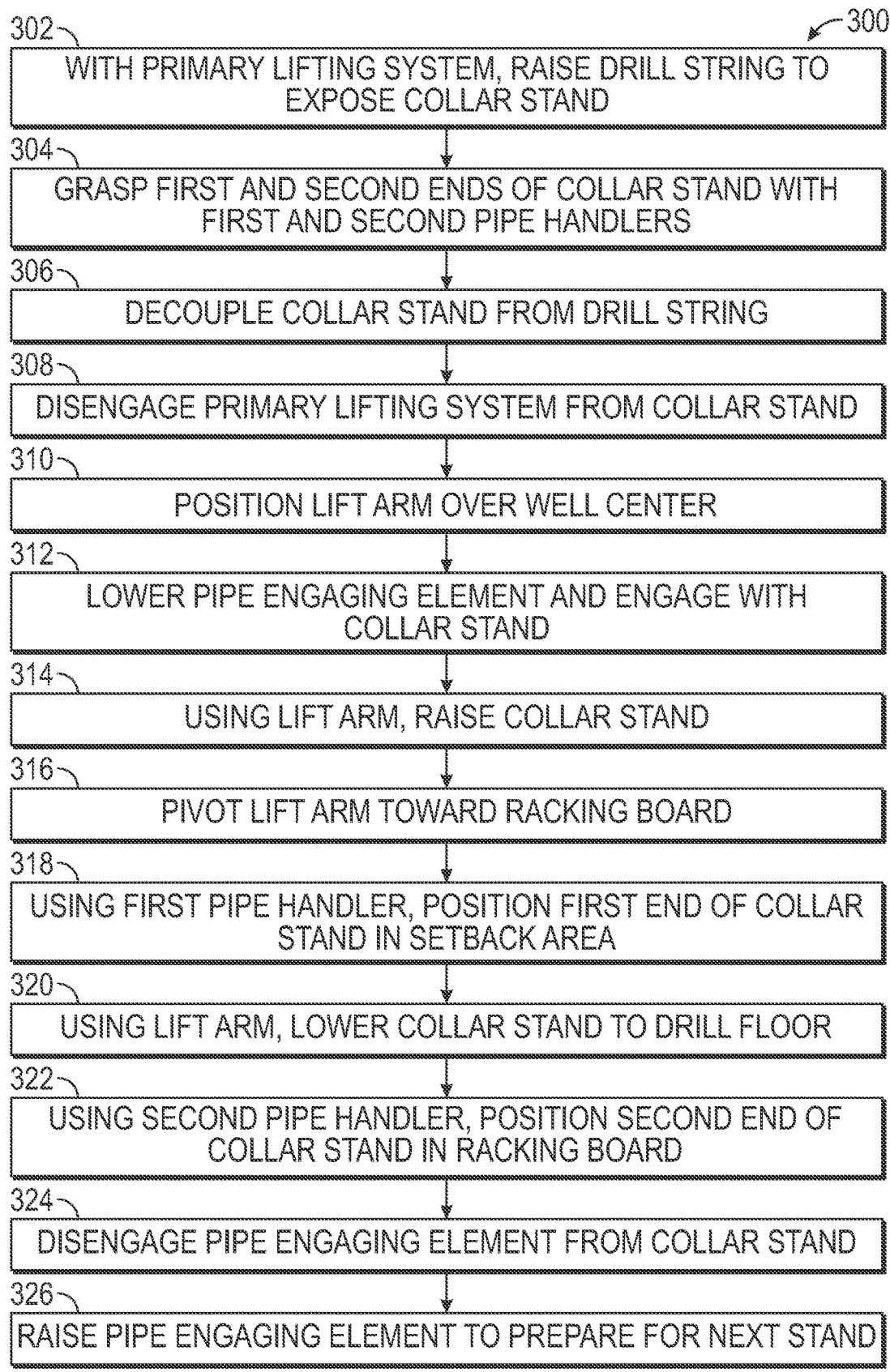
FIG. 11 is a flow diagram of a method of tripping pipe out of a well of the present disclosure, according to one or more embodiments.

Turning now to FIG. 11, a method 300 of tripping in is shown, according to one or more embodiments. The method 300 may provide for tripping in drill pipe or drill collar so as to move the drill collar or pipe from the racking board 108 or another storage area to well center 101 so as to form part of a drill string. The method 300 may include: with a primary lifting system, raising the drill string to expose a collar stand 302; grasping first and second ends of the collar stand with first and second pipe handlers 304; decoupling the collar stand from the drill string 306; disengaging the primary lifting system from the collar stand 308; positioning the lift arm over well center 310; lowering the pipe engaging element and engaging with the collar stand 312; using the lift arm, raising the collar stand 314; pivoting the lift arm toward the racking board 316; using the first pipe handler, positioning the first end of collar stand in setback area 318; using the lift arm, lowering the collar stand to drill floor 320; disengaging the pipe engaging element from the collar stand 322; raising the pipe engaging element to prepare for a next stand 324; and using the second pipe handler, positioning the second end of collar stand in the racking board 326. In other embodiments, the method 300 may include additional and/or alternative steps. Moreover, it is to be appreciated that while the method 300 is described with respect to drill collar and a drill collar stand, the method may additionally be performed using regular drill pipe and/or other types of pipe or conduit. Moreover, a method of tripping may include steps or operations described in International Patent Application Number PCT/US2019/044974, which was previously incorporated by reference herein.

To remove lengths or stands of drill collar from a drill string (trip out), a primary lifting system, such as a top drive pipe elevator or other lifting system, may be used to raise the drill string to expose a collar stand above the drill floor (302). This may be performed using a drill line reeved through a traveling block and crown block of the mast, for example. While coupled to the drill string via a pipe elevator, for example, the traveling block may be raised upward toward the crown block until a length or stand of drill collar is exposed above the drill floor. In some embodiments, slips may be arranged at or near the drill floor around the drill string to help hold the drill string in place with respect to the drill floor.

With the length or stand of drill collar exposed, one or more pipe handlers may grasp the collar. For example and as may be seen in FIG. 1, first and second pipe handlers may grasp first and second ends of the collar stand (304). The pipe handlers may be or include pipe handling robots in some embodiments. As described above, the first pipe handler may be a drill floor pipe handler arranged on the drill floor, and the second pipe handler may be a racking board pipe handler arranged on the racking board. Each pipe handler may have an end effector sized and configured to grasp, or otherwise engage with, the collar stand.

The collar stand may be decoupled from the drill string (306). For example, an iron roughneck arranged on the drill floor may be employed to unscrew the collar stand from the drill string where the collar is coupled via a threaded connection. In other embodiments, other decoupling mechanisms and methods may be used. The collar stand may remain atop the drill string (although no longer coupled thereto). The primary lifting system may be disengaged from the collar stand (308). For example, where the collar stand was held by a pipe elevator, the elevator may be released, and the lifting system may be raised or lowered away from the collar stand. It is to be appreciated that the weight of the collar stand may be supported by the slips while the first and second pipe handlers may help to stabilize the collar stand.

Figure 12:
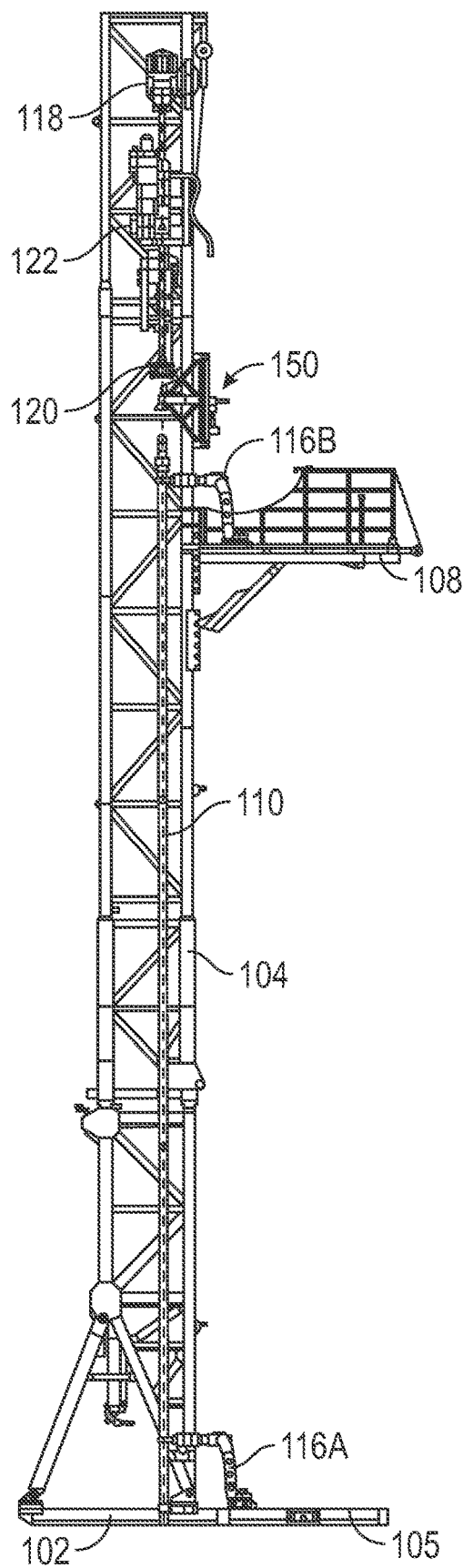
FIG. 12 is a side view of a drilling rig of the present disclosure, showing a collar stand over well center engaged by a lift arm and two pipe handlers, according to one or more embodiments.

The lift arm may be positioned over well center (310) so as to prepare for engagement with the collar stand. In particular, the lift arm may be pivoted or swung about its pivoted connection to the mast and/or the telescoping boom may be extended or retracted so as to align the pipe engaging element over the collar stand. Moreover, the pipe engaging element may be lowered to engage with the collar stand (312). For example, where the pipe engaging element or lift arm is arranged on a lift line, the line may be released (via a hydraulic cylinder or drawworks, for example), to lower the pipe engaging element toward the collar stand. The pipe engaging element may further clamp onto or otherwise engage with an upper end of the collar stand. FIG. 12 illustrates an example of a pipe engaging element 156 lowered on a lift line 158 and engaging with a collar stand 110 while the first and second pipe handlers 116 remain engaged with the collar stand.

Figure 13:
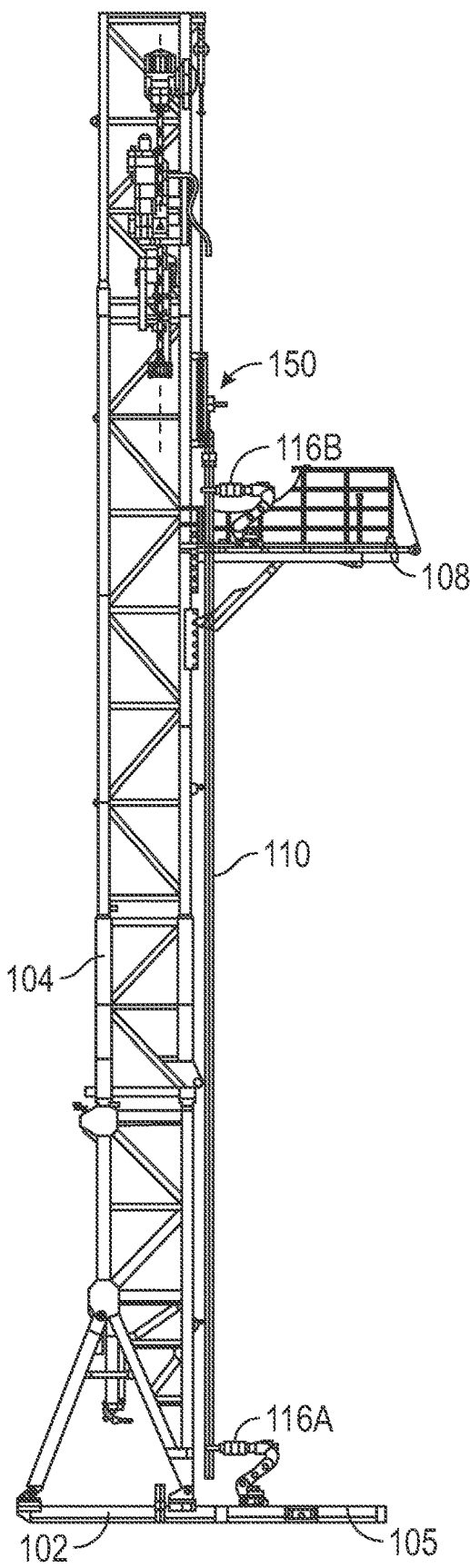
FIG. 13 is another side view of the drilling rig of FIG. 12, showing the lift arm having pivoted toward the racking board, according to one or more embodiments.
Figure 14:
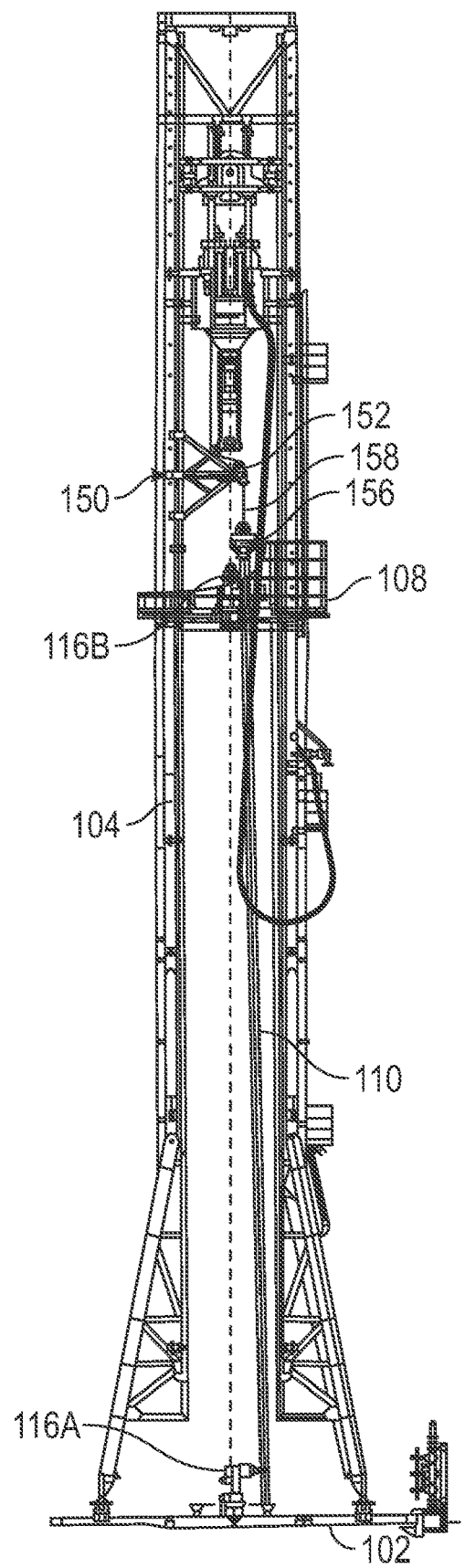
FIG. 14 is a front view of the drilling rig of FIG. 12, according to one or more embodiments.
Figure 15:
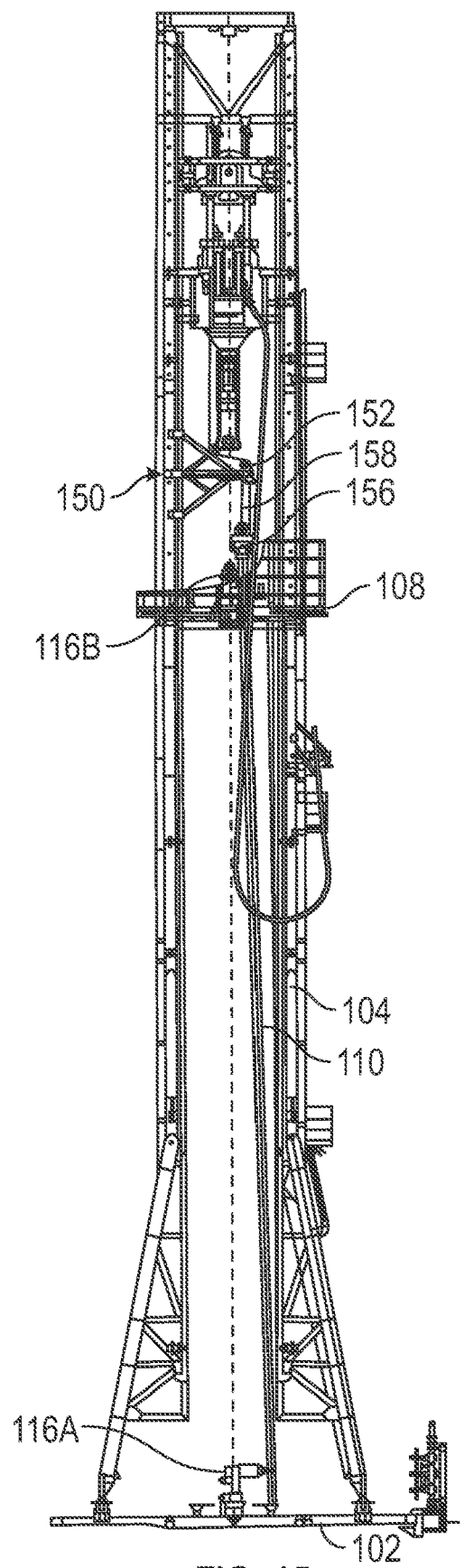
FIG. 15 is another front view of the drilling rig of FIG. 12, showing the lift arm boom in an extended configuration, according to one or more embodiments.

With the pipe engaging element engaged with the collar stand, the lift arm may be operated to raise the collar stand off of the drill string (314). In this way, the weight of the collar stand may be transferred from the slips or drill string to the lift arm. While the lift arm raises and/or otherwise manipulates the collar stand, the first and second pipe handlers may remain engaged with the collar stand. With the collar stand, the lift arm may be pivoted toward the racking board (316) or toward another area or location where the collar stand is to be stored or arranged. This may be seen for example in FIG. 13. It is to be appreciated that as the lift arm moves the collar stand, one or both pipe handlers may move as well. For example, the drill floor pipe handler 116a may move along a track on the drill floor 102 and the racking board pipe handler 116b may move along a track on the racking board 108 so as to generally follow movement of the collar stand. Additionally, in some embodiments, the lift arm boom may be extended or retracted as desired. For example, to reach a storage location furthest from the boom, the boom may be extended toward the storage location of the racking board. FIGS. 14 and 15 illustrate the boom 152 in a retracted and an extended configuration, respectively.

Figure 16:
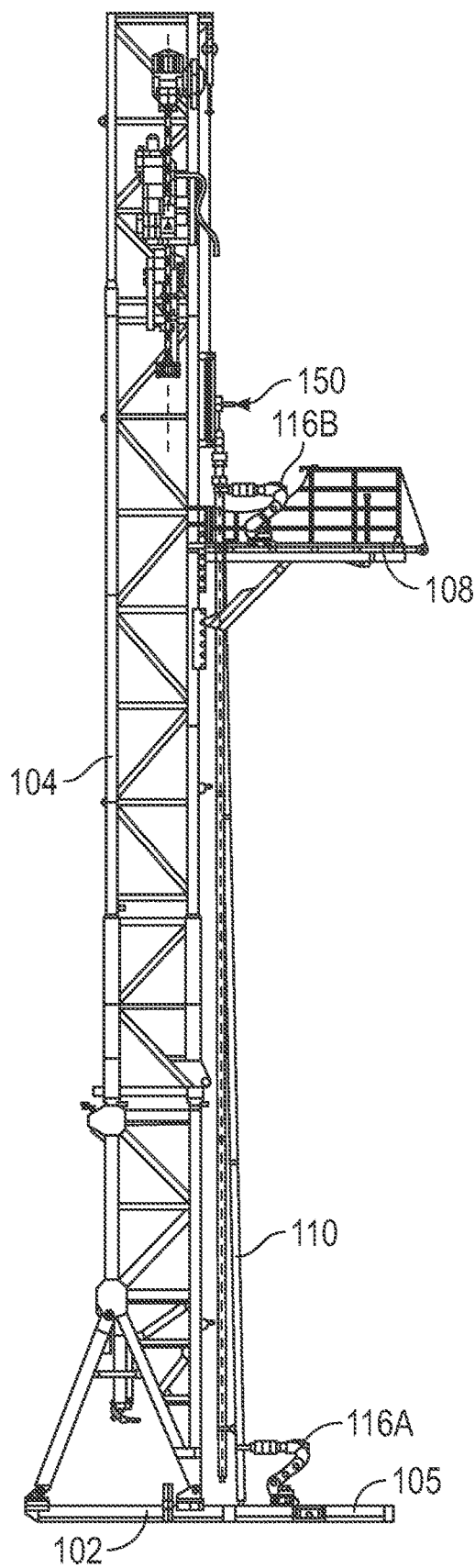
FIG. 16 is another side view of the drilling rig of FIG. 12, showing the drill floor pipe handler arranging a lower end of the collar stand in a setback area, according to one or more embodiments.

The method 300 may further include positioning the first end of the collar stand in the setback area of the drill floor (318). The drill floor pipe handler may operate to manipulate the first end (or lower end) of the collar stand. The pipe handler may move position the lower end of the collar stand so as to align with a particular storage position of the racking board 108 where the collar stand will be placed for storage. Subsequently or simultaneously, the lift arm may lower the collar stand to the drill floor (320), such that weight of the collar stand is transferred from the lift arm to the drill floor. The lift line of the lift arm may release so as to lower the pipe engaging element and thus lower the collar stand to the drill floor. FIG. 16 shows an example of the collar stand 110 lowered to the drill floor 102 in the setback area 105 beneath the racking board 108. As shown, the drill floor pipe handler 116a may remain engaged with the collar stand while it is lowered to the drill floor 102.

Once the weight, or a substantial portion of the weight, of the collar stand is transferred to the drill floor, the pipe engaging element may be disengaged from the collar stand (322). For example, where the pipe engaging element comprises a collar clamp or pipe elevator, the clamp or elevator may be opened so as to release the collar stand. Additionally, the pipe engaging element may be raised toward the boom via the lift line to prepare for engaging with and hoisting a next collar stand of the drill string (324). In some embodiments, the drill floor pipe handler may disengage from the collar stand being arranged in the racking board, and the drill floor pipe handler may proceed toward well center to prepare for engaging with a next collar stand.

Figure 17:
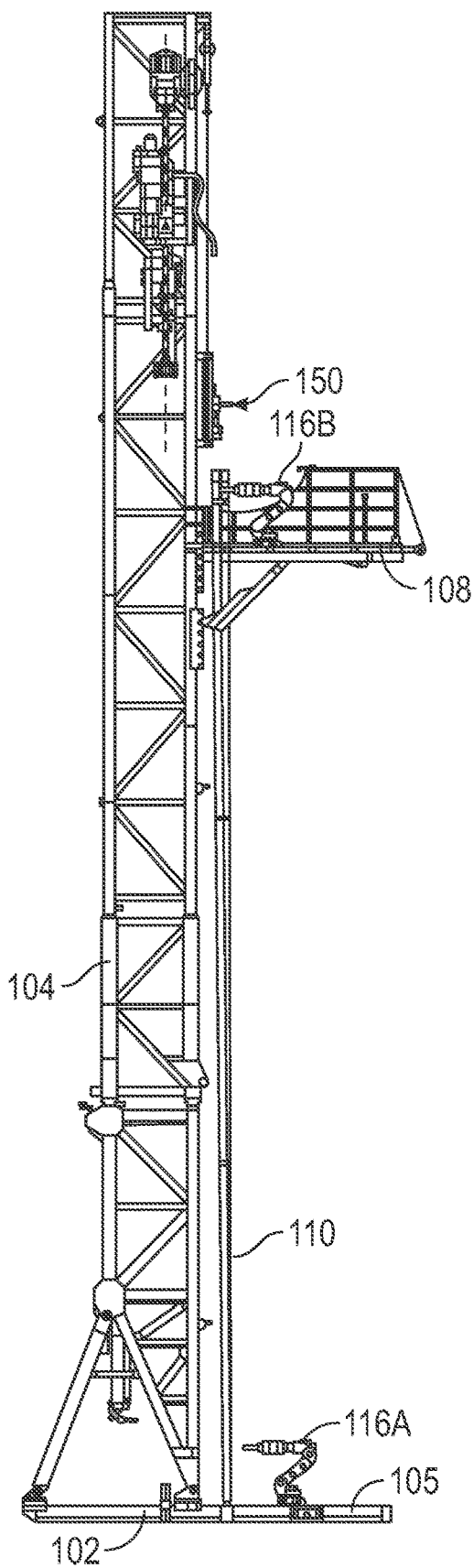
FIG. 17 is another side view of the drilling rig of FIG. 12, showing the racking board pipe handler arranging an upper end of the collar stand in a racking board, according to one or more embodiments.

With respect to the collar stand being positioned into the racking board, the second, or upper, end of the collar stand may be positioned in the racking board using the second pipe handler (326). With the lower end of the collar stand on the drill floor, such that the weight of the collar stand is held, or substantially held, by the drill floor, the racking board pipe handler may manipulate an upper end of the collar stand into a desired storage location of the racking board. The racking board pipe handler may position the upper end of the collar stand to a racking board location that is aligned with the lower end of the collar stand, such that the collar stand may be stored on end and substantially perpendicular to the drill floor. This may be seen with respect to FIG. 17, for example. As shown, the lift arm 150 may be disengaged from the collar stand 110 while the racking board pipe handler 116b manipulates an upper end of the collar stand into the racking board 108. However, in other embodiments, the pipe engaging element of the lift arm may remain coupled to the collar stand while the upper end is positioned in the racking board. Once the upper end of the collar stand is arranged in the racking board, the racking board pipe handler may disengage from the collar stand, and the racking board pipe handler may proceed toward well center to engage with a next collar stand.

The method 300, or portions thereof, may be repeated for multiple collar stands and/or pipe stands, until a desired portion of the drill string is removed from the well (tripped out). It is further to be appreciated that the devices and systems described herein may further manipulate drill collar and/or drill pipe to perform a trip in operation. In a trip in operation, lengths or stands of drill collar and/or drill pipe may be obtained from a storage position in the racking board and setback area, brought to well center and joined to a drill string, and lowered into the well. It is further to be appreciated that a method of tripping in may generally operate as a reverse of the method 300 of tripping out.

For example, the first and second pipe handlers may engage with a collar stand stored in the racking board, and the lift arm may couple to and hoist the collar stand so as to transfer weight of the collar stand from the drill floor to the lift arm. The first and second pipe handlers may manipulate the lower and upper ends of the collar stand, respectively, and the lift arm may pivot toward well center to align the collar stand with a drill string. The lift arm may lower the collar stand onto the drill string such that it may be connected to the drill string. In some embodiments, a primary lifting system, such as a pipe elevator arranged on a traveling block, or another suitable lifting system may engage with the collar stand, and the lift arm may disengage from the collar stand. The first and second pipe handlers may disengage from the collar stand. The primary lifting system may lower the collar stand into the well, while the lift arm and pipe handlers prepare to engage with a next collar stand or pipe stand arranged in the racking board.

It is to be appreciated that, with respect to drill collar and/or other relatively heavy pipe elements, devices, systems, and methods of the present disclosure may help to minimize tip angle of the collar during handling operations. In particular, by pivoting between well center and a racking board and/or by extending and retracting a boom, a lift arm of the present disclosure may provide hoisting capabilities while allowing a collar stand to remain relatively upright with respect to the drill floor while it is manipulated between well center and the racking board. Without such a lift arm, a primary lifting system may only hoist the collar stand substantially in line with well center, such that robotic or manual pipe handlers may need to manipulate the ends of the collar stand a further distance away from the hoisting location, which in turn may increase a tip angle of the collar stand during such manipulation. The pivotable hoisting capabilities of the lift arm may thus reduce tip angle of the collar stand during trip in and trip out operations. In some embodiments, a longitudinal axis of the collar stand may be maintained at an angle of between approximately 75 degrees and approximately 105 degrees, or between approximately 80 degrees and approximately 100 degrees, or between approximately 85 degrees and approximately 95 degrees, relative to the drill floor, during trip in and trip out operations.

A reduced tip angle of the collar stand may improve safety of trip in and trip out operations. Where pipe handlers are, or are manually operated by, human workers, a reduced tip angle may provide for safer working conditions for the operators and/or other rig workers. Additionally, the reduced tip angle may reduce lift capacity requirements for the pipe handlers. This may further improve safety for manual handlers, for example. Moreover, where robotic or other automated or partially automated pipe handlers are employed, relatively low capacity and/or low cost or off-the-shelf components may be used.

It is to be appreciated that a lift arm of the present disclosure may have a relatively high lift capacity configured for handling drill collar and/or other relatively heavy drilling pipe.

Devices and systems of the present disclosure may additionally be used to facilitate accelerated tripping operations. Accelerated tripping operations may include use of a traveling block that is designed to travel along the length of a pipe when it is at well center and above the drill floor, such that the traveling block does not have to wait for the pipe stand to clear well center before raising or lowering to prepare for a next pipe stand. A lift arm of the present disclosure may be operated in conjunction with such a traveling block to accelerate trip in and/or trip out operations. A traveling block assembly configured for accelerated tripping operations is described, for example, in International Patent Application Number PCT/US2019/044979, entitled Accelerated Tripping Systems and Methods, and filed Aug. 2, 2019, the content of which is hereby incorporated herein by reference in its entirety.

Figure 18:
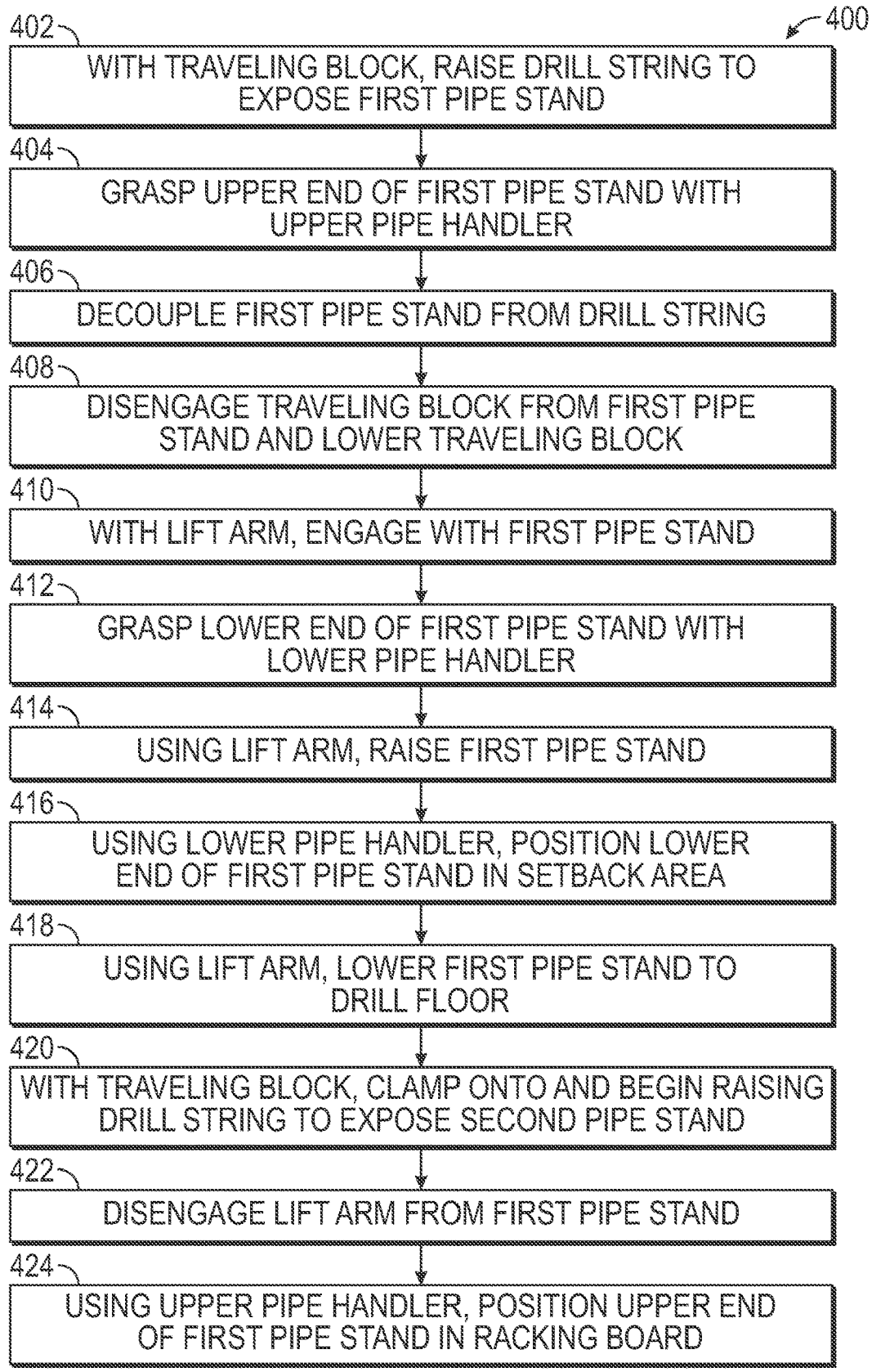
FIG. 18 is a flow diagram of a method of an accelerated trip out operation of the present disclosure, according to one or more embodiments.

Turning now to FIG. 18, a method 400 of performing an accelerated trip out operation is shown, according to at least one embodiment. The method 400 may include: with a traveling block, raising the drill string to expose a first pipe stand 402; grasping an upper end of the first pipe stand with an upper pipe handler 404; decoupling the first pipe stand from the drill string 406; disengaging the traveling block from the first pipe stand and lowering the traveling block 408; with the lift arm, engaging with the first pipe stand 410; grasping a lower end of the first pipe stand with a lower pipe handler 412; using the lift arm, raising the first pipe stand 414; using the lower pipe handler, positioning the lower end of the first pipe stand in the setback area 416; using the lift arm, lowering the first pipe stand to the drill floor 418; with the traveling block, clamping onto and beginning to raise the drill string to expose a second pipe stand 420; disengaging the lift arm from the first pipe stand 422; and using the upper pipe handler, positioning the upper end of the first pipe stand in the racking board 424. In other embodiments, the method 400 may include additional and/or alternative steps. Moreover, a method of accelerated tripping may include steps or operations described in International Patent Application Number PCT/US2019/044979, which was previously incorporated by reference herein.

Figure 19:
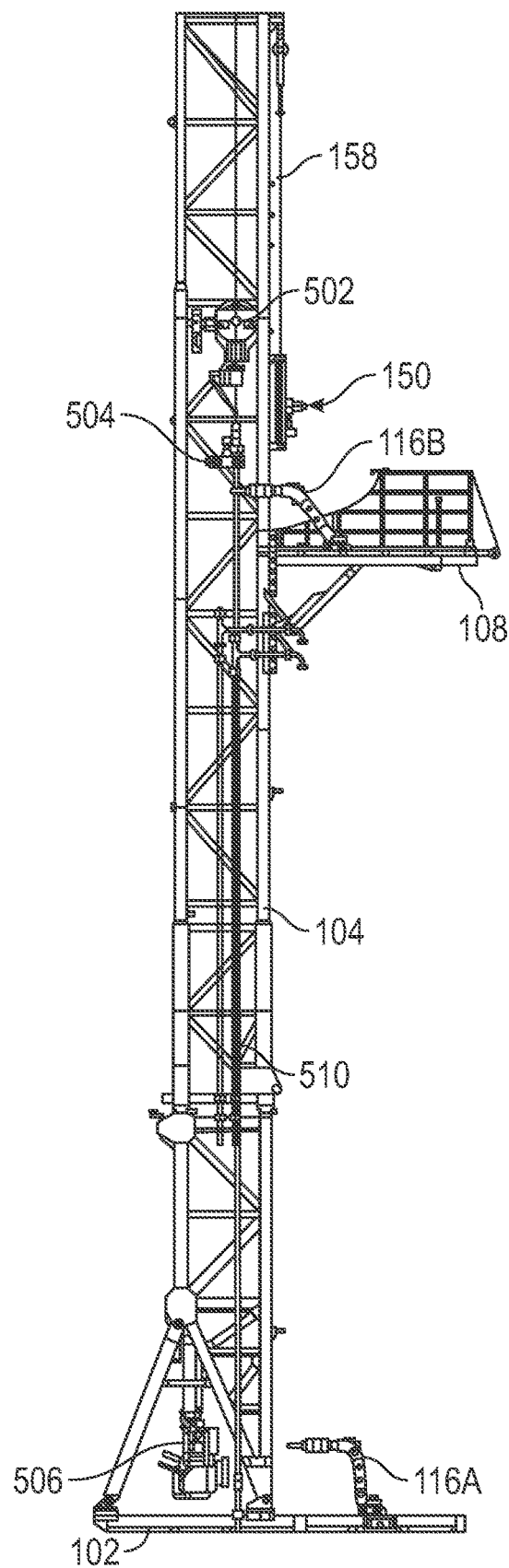
FIG. 19 is a side view of a drilling rig of the present disclosure, showing a pipe stand over well center engaged by a pipe elevator and a racking board pipe handler, according to one or more embodiments.
Figure 20:
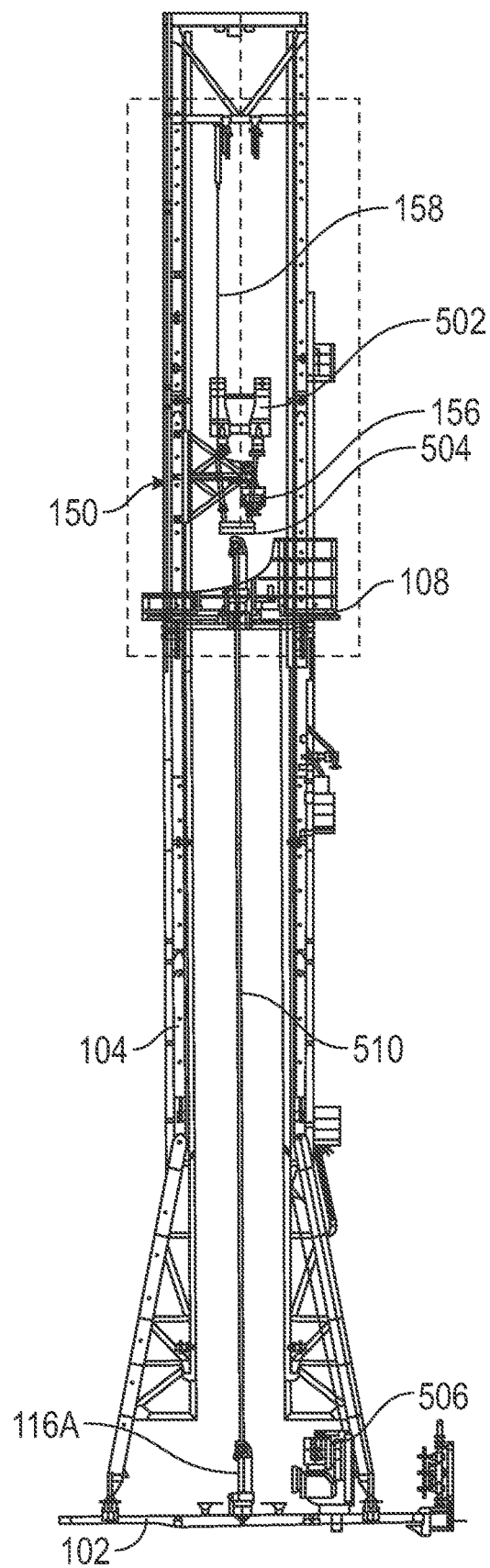
FIG. 20 is a front view of the drilling rig of FIG. 19, according to one or more embodiments.

To remove a first pipe stand from the drill string, the traveling block, having a pipe elevator or clamp arranged thereon, may by lowered near the drill floor to engage with the drill string. With the drill string engaged, the traveling block may be raised to expose the first pipe stand above the drill floor (402). In some embodiments, slips may be placed around the drill string at the drill floor to help hold the drill string in place. With the first pipe stand exposed, the racking board pipe handler, which may be a robotic pipe handler in some embodiments, may grasp an upper end of the pipe stand (404). FIGS. 19 and 20 show an example of a traveling block 502 and pipe elevator 504 holding a drill string at well center so as to expose a pipe stand 510 above the drill floor 102. As further shown in FIG. 19, a racking board pipe handler 116*b* may reach toward well center to engage with the pipe stand 510. The pipe stand 510 may be decoupled from the remainder of the drill string (406). This may be performed using an iron roughneck 506 arranged on the drill floor, for example. Further, the pipe elevator may be disengaged form the first pipe stand, and the traveling block may be lowered toward the drill floor (408). As described above, the traveling block may be configured such that it may raise and lower without interfering with the pipe stand exposed at well center.

Figure 21:
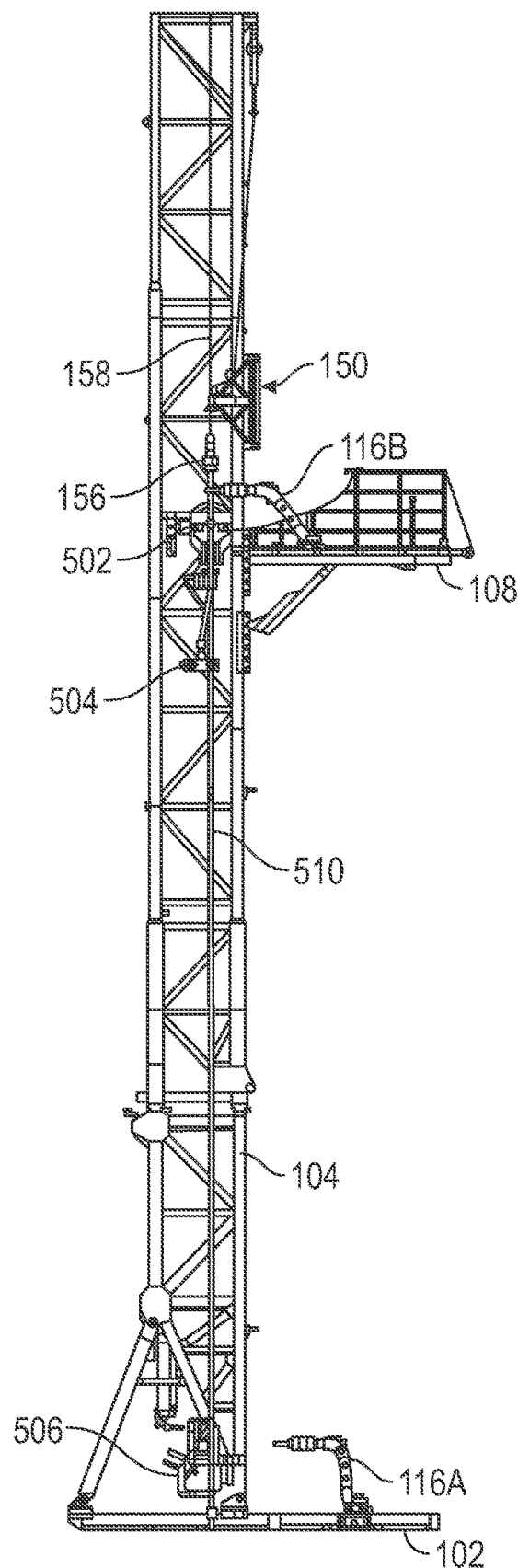
FIG. 21 is another side view of the drilling rig of FIG. 19, showing the pipe stand engaged by a lift arm and the racking board pipe handler while a traveling block lowers toward the drill floor, according to one or more embodiments.
Figure 22:
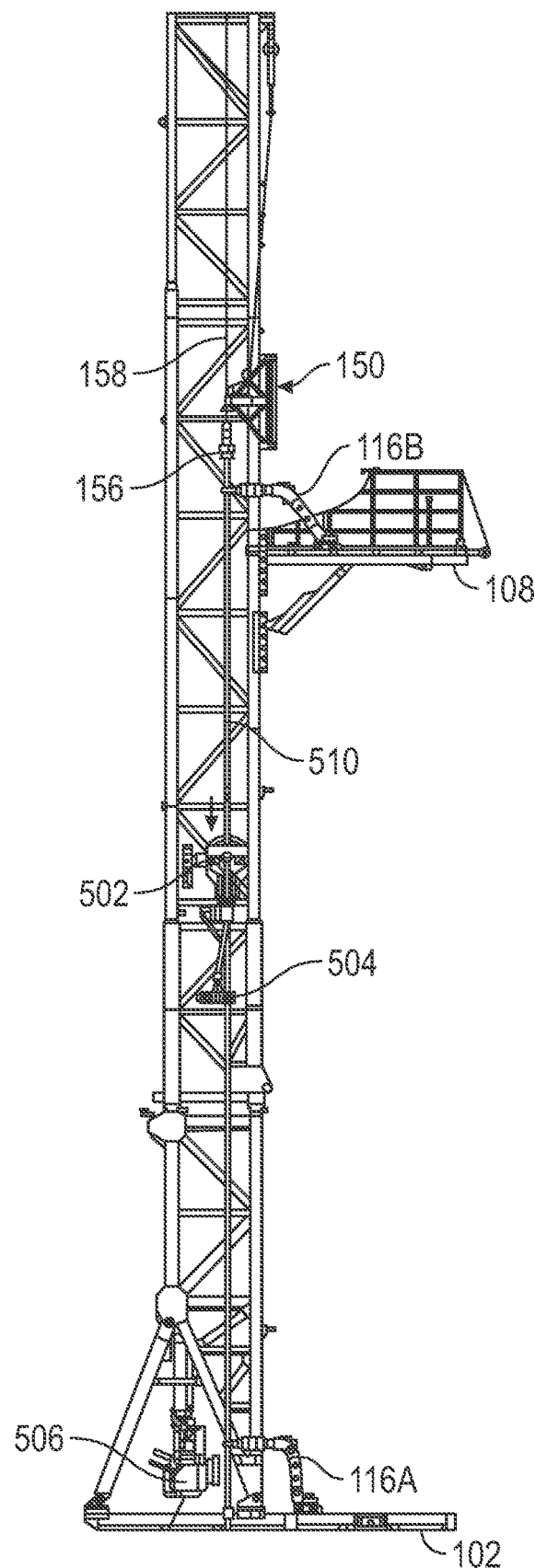
FIG. 22 is another side view of the drilling rig of FIG. 19, showing the pipe stand engaged by the lift arm, racking board pipe handler, and drill floor pipe handler, while the traveling block lowers toward the drill floor, according to one or more embodiments.

As the traveling block lowers to prepare for receiving a second pipe stand, the lift arm may be used to continue racking the first pipe stand. Thus, the lifting capacities of the traveling block and the lift arm can be leveraged together to facilitate handling consecutive pipe stands relatively quickly. In particular, the lift arm may be pivoted toward well center, and the pipe engaging element may be lowered to engage with the pipe stand (410). FIG. 21 shows the lift arm 150 engaged with the pipe stand 510 as the traveling block 502 and pipe elevator 504 begin lowering toward the drill floor 102. As shown in FIG. 22, a drill floor pipe handler 116a, which may be a robotic pipe handler, may grasp a lower end of the pipe stand 510 (412). As additionally shown in FIG. 22, the lift arm 150 may be used to raise the pipe stand 510 off of the remaining drill string (414). For example, the lift line 158 may be withdrawn or retracted to draw the pipe engaging element 156 away from the drill floor 102. Thus, the weight of the pipe stand may be held, or substantially held, by the lift arm.

Figure 23:
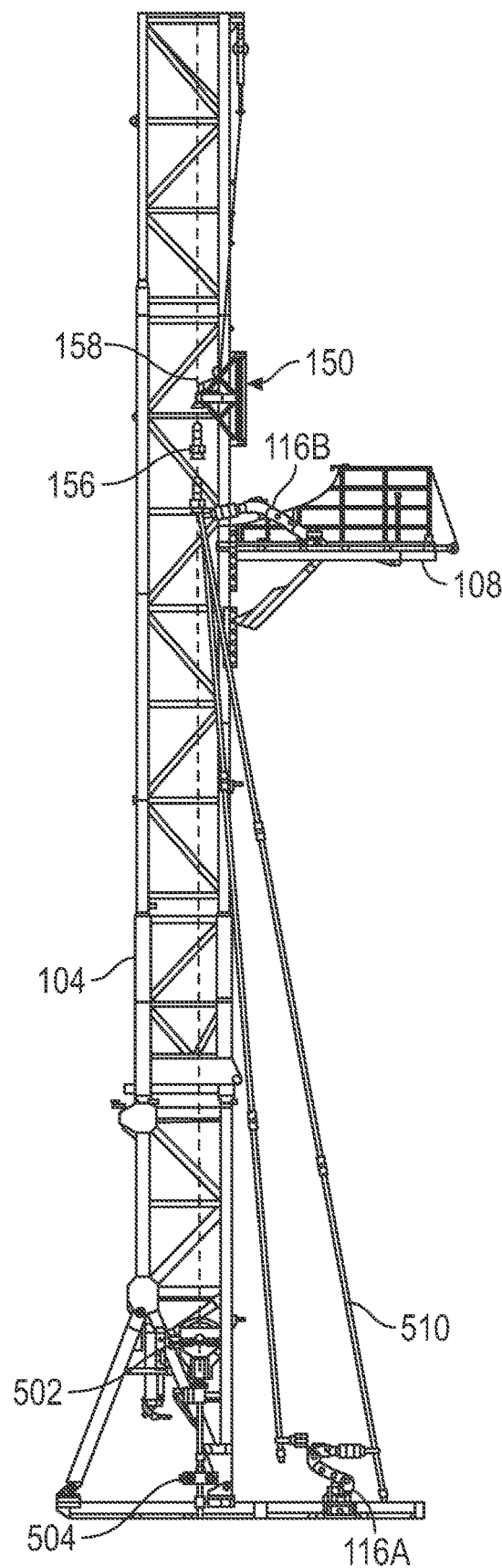
FIG. 23 is another side view of the drilling rig of FIG. 19, showing the drill floor pipe handler arranging a lower end of the pipe stand in a setback area, according to one or more embodiments.
Figure 24:
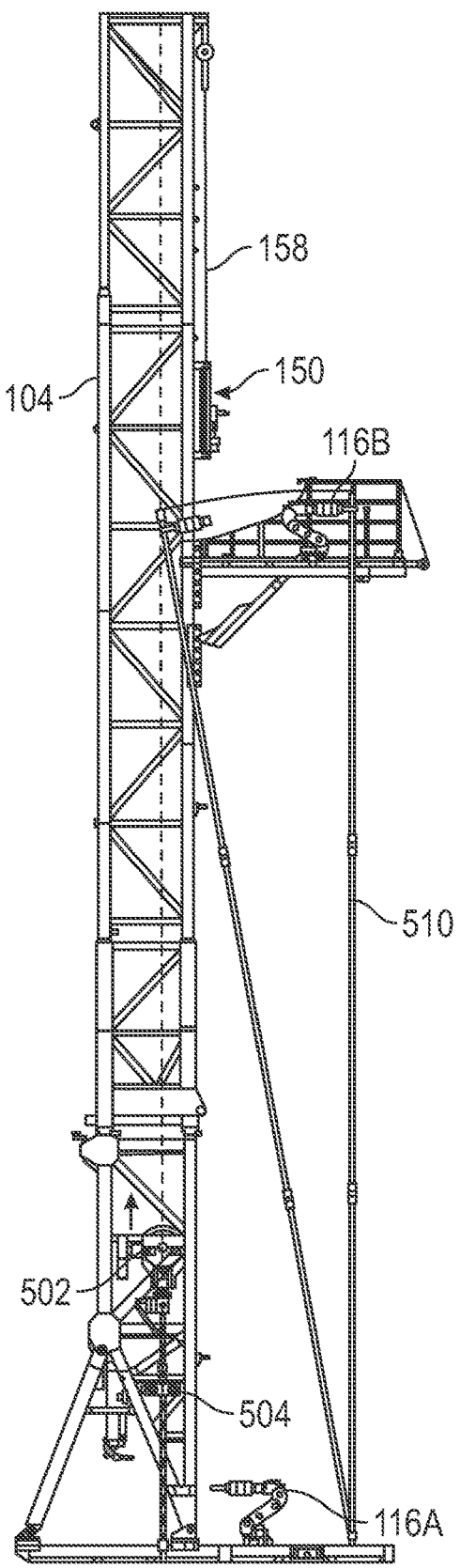
FIG. 24 is another side view of the drilling rig of FIG. 19, showing the racking board pipe handler arranging an upper end of the pipe stand in a racking board, while the pipe elevator raises the drill string, according to one or more embodiments.

While grasping the lower end of the pipe stand, the drill floor pipe handler may move to position the lower end of the pipe stand in the setback area of the drill floor (416). This may be seen, for example, in FIG. 23. The lift arm may also lower the first pipe stand to the drill floor (418), such that the weight of the pipe stand may transfer substantially to the drill floor. As may be appreciated with respect to FIG. 23, with the lower end of the pipe stand 510 positioned in the setback area of the drill floor 102, and thus cleared from well center, the traveling block 502 may clamp onto and begin raising the drill string to expose a second pipe stand (420). With the weight of the first pipe stand on the drill floor, the lift arm may be disengaged from the first pipe stand (422). The racking board pipe handler may move to position the upper end of the pipe stand in the racking board (424), so as to be aligned with the lower end and store the pipe stand in an upright configuration. This may be seen for example in FIG. 24.

It is to be appreciated that some steps of the accelerated trip out method 400 may be performed simultaneously so as to improve speed of handling. For example, as soon as slips or placed around the drill string, the pipe elevator may be disengaged from the pipe stand and the traveling block may begin lowering toward the drill floor in some embodiments. The traveling block may continue lowering while the pipe stand is disengaged from the drill string, while the lift arm engages with and lifts the pipe stand, and/or while the upper and lower pipe handlers manipulate the pipe stand. Other steps may be performed simultaneously as well.

It is further to be appreciated that the lift arm may be similarly used for an accelerated trip in operation for adding lengths or stands of pipe to a drill string and lowering them into a well with relative speed. An accelerated trip in operation may operate in generally a reverse order of the accelerated trip out operation 400.

It may further be appreciated that the accelerated tripping methods described herein may introduce higher pipe stand tip angles than other tripping methods described herein. The pipe handlers may be configured for handling the loading produced by such tip angles for drill pipe and, in some embodiments, for drill collar as well. Although, because drill pipe is typically lighter weight than drill collar, the higher tip angles may be less of a concern with respect to conventional pipe stands. Accordingly, the accelerated tripping methods described herein may be particularly applicable with respect to stands of drill pipe.

It is to be appreciated that, while the present disclosure is described with respect to particular embodiments, feature described with respect to one embodiment are not necessarily restricted to that embodiment. That is, features of the various embodiments may be combined with features of other embodiments.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A lift arm for handling a drilling pipe, the lift arm comprising:
 a boom secured to a mast of a drilling rig at a pivotable coupling, arranged at a first end of the boom, and at a location above a racking board of the drilling rig, the boom extending laterally, relative to the mast, from the first end to a second end;
 a pipe engaging element coupled to the boom at the second end and configured to engage with a box end of the drilling pipe; and
 a lift line configured to raise and lower the pipe engaging element along the mast to lift and carry the drilling pipe;
 wherein the pivotable coupling is configured to allow the boom to pivot about a vertical axis generally parallel to the mast;
 wherein the boom is configured to pivotally swing the second end about the pivotable coupling while carrying the drilling pipe between a position at well center and a position in a setback area.

2. The lift arm of claim 1, wherein the boom is extendable along a longitudinal axis of the boom.

3. The lift arm of claim 1, wherein the lift line extends from a hydraulic cylinder or a winch.

4. The lift arm of claim 1, wherein the boom is arranged on a rail, and wherein the lift line is configured to raise and lower the pipe engaging element by way of raising and lowering the boom along the rail.

5. The lift arm of claim 1, further comprising a hydraulic cylinder for pivoting the boom.

6. The lift arm of claim 1, wherein the pipe engaging element comprises a collar clamp or pipe elevator.

7. A drilling rig comprising:
- a drill floor configured for arrangement above a well and having an opening for accessing the well;
- a mast extending from the drill floor;
- a racking board arranged along the mast and adapted for receiving and for bracing top portions of drilling pipe; and
- a lift arm for lifting and carrying the drilling pipe, the lift arm comprising:
  - a boom secured to the mast at a pivotable coupling, arranged at a first end of the boom, and at a location above the racking board, the boom extending laterally, relative to the mast, from the first end to a second end;
  - a pipe engaging element coupled to the boom at the second end and configured to engage with a box end of the drilling pipe; and
  - a lift line configured to raise and lower the pipe engaging element along the mast to lift and carry the drilling pipe;
  - wherein the pivotable coupling is configured to allow the boom to pivot about a vertical axis generally parallel to the mast,
  - wherein, the boom is configured to pivotally swing the second end about the pivotable coupling while carrying the drilling pipe between a position at well center and a position in a setback area.

8. The drilling rig of claim 7, further comprising a robotic pipe handler.

9. The drilling rig of claim 8, wherein the robotic pipe handler is a first robotic pipe handler arranged on the drill floor, the drilling rig further comprising a second robotic pipe handler arranged on a racking board.

10. The drilling rig of claim 7, further comprising a primary lifting system comprising a cable reeved between a crown block and a traveling block.

11. The drilling rig of claim 7, wherein the boom is extendable along a longitudinal axis of the boom.

12. The drilling rig of claim 7, wherein the lift line extends from a hydraulic cylinder or a winch.

13. The drilling rig of claim 7, wherein the boom is arranged on a rail, and wherein the lift line is configured to raise and lower the boom along the rail.

14. A method of handling drill collar for use in a drilling operation, the method comprising:
- engaging a box end of a collar stand with a pipe engaging element of a lift arm;
- hoisting the collar stand using the lift arm, the lift arm comprising:
  - a boom secured to a mast at a pivotable coupling, arranged at a first end of the boom, and at a location above a racking board, the boom extending laterally, relative to the mast, from the first end to a second end; wherein the pipe engaging element is coupled to the boom at the second end and configured to engage with the box end of the collar stand; and
  - a lift line configured to raise and lower the pipe engaging element along the mast to lift and carry the collar stand, wherein the pivotable coupling is configured to allow the boom to pivot about a vertical axis generally parallel to the mast;
- pivotin the second end of the boom about the pivotable coupling to move the hoisted collar stand between a position at well center and a position in a setback area;
- using a first pipe handler, manipulating a first end of the collar stand; and
- using a second pipe handler, manipulating a second end of the collar stand.

15. The method of claim 14, wherein the first pipe handler is a robotic pipe handler arranged on a drill floor of a drilling rig.

16. The method of claim 15, wherein the second pipe handler is a robotic pipe handler arranged on a racking board of the drilling rig.

17. The method of claim 14, wherein hoisting the collar stand comprises coupling the pipe engaging element to the collar stand at the second end and raising the pipe engaging element via the lift line.

* * * * *

UNITED STATES PATENT AND TRADEMARK OFFICE
CERTIFICATE OF CORRECTION

| | | |
|---|---|---|
| PATENT NO. | : 11,891,864 B2 | Page 1 of 1 |
| APPLICATION NO. | : 17/310188 | |
| DATED | : February 6, 2024 | |
| INVENTOR(S) | : Donnally et al. | |

It is certified that error appears in the above-identified patent and that said Letters Patent is hereby corrected as shown below:

On the Title Page

On page 4, in Column 1, item (56) under "Other Publications", Line 33, delete "ated" and insert --dated-- therefor On page 4, in Column 2, item (56) under "Other Publications", Line 19, delete "1017"," and insert --2017",-- therefor On page 5, in Column 2, item (56) under "Other Publications", Line 68, delete "Contstraint" and insert --Constraint-- therefor In the Claims In Column 19, Line 37, in Claim 7, delete "mast," and insert --mast;-- therefor In Column 20, Line 14, in Claim 14, delete "ann" and insert --arm-- therefor In Column 20, Line 20, in Claim 14, delete "end;" and insert --end,-- therefor In Column 20, Line 28, in Claim 14, delete "pivotin" and insert --pivoting-- therefor Signed and Sealed this
Twenty-ninth Day of April, 2025

Coke Morgan Stewart
*Acting Director of the United States Patent and Trademark Office*